(12) United States Patent
Hwang et al.

(10) Patent No.: US 7,769,212 B2
(45) Date of Patent: *Aug. 3, 2010

(54) STATISTICAL QUALITY ASSESSMENT OF FINGERPRINTS

(75) Inventors: Kyungtae Hwang, Acton, MA (US); Nam-Deuk Kim, Andover, MA (US)

(73) Assignee: L-1 Secure Credentialing, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/349,205

(22) Filed: Jan. 6, 2009

(65) Prior Publication Data

US 2009/0196469 A1   Aug. 6, 2009

Related U.S. Application Data

(63) Continuation of application No. 10/913,015, filed on Aug. 6, 2004, now Pat. No. 7,489,807.

(60) Provisional application No. 60/493,690, filed on Aug. 7, 2003, provisional application No. 60/557,856, filed on Mar. 26, 2004.

(51) Int. Cl.
*G06K 9/00* (2006.01)

(52) U.S. Cl. ........................................ 382/124

(58) Field of Classification Search ................. 382/115, 382/124–127, 218, 294; 283/68–70
See application file for complete search history.

(56) References Cited

U.S. PATENT DOCUMENTS

| | | | | |
|---|---|---|---|---|
| 3,959,884 A * | 6/1976 | Jordan et al. | ................. | 283/69 |
| 4,832,485 A * | 5/1989 | Bowles | ....................... | 356/71 |
| 5,623,552 A * | 4/1997 | Lane | .......................... | 382/124 |
| 5,995,640 A * | 11/1999 | Bolle et al. | ................. | 382/124 |
| 7,072,523 B2 * | 7/2006 | Bolle et al. | ................. | 382/254 |
| 7,120,280 B2 * | 10/2006 | Biswas et al. | ............... | 382/124 |
| 7,142,699 B2 * | 11/2006 | Reisman et al. | ............. | 382/124 |
| 2002/0030359 A1 * | 3/2002 | Bergenek et al. | ............. | 283/68 |

* cited by examiner

*Primary Examiner*—Daniel G Mariam
(74) *Attorney, Agent, or Firm*—Mintz Levin Cohn Ferris Glovsky and Popeo, P.C.

(57) ABSTRACT

The present invention relates generally to human fingerprints. More specifically the present invention relates to assessing the quality of a fingerprint image. An assessment is made by analyzing characteristics of image sub-regions. For example, the characteristics may include statistics that are associated with a sub-region. If a sub-region is found to have unacceptable characteristics, it can be modified through a morphological operation to compensate for the unacceptable characteristics.

16 Claims, 17 Drawing Sheets

FIG. 1

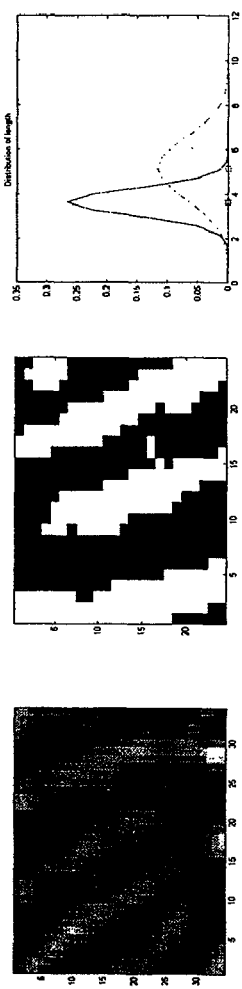
FIG. 5a (i) Good sample; (ii) Rotated B/W; and (iii) Gaussian PDF
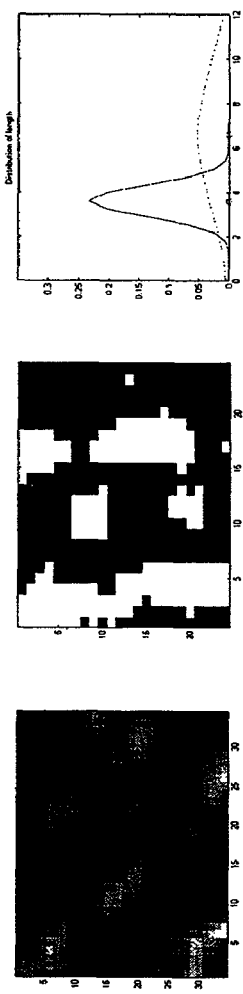
FIG. 5b (i) Wet sample; (ii) Rotated B/W; and (iii) Gaussian PDF
FIG. 5c (i) Dry sample; (ii) Rotated B/W; and (iii) Gaussian PDF

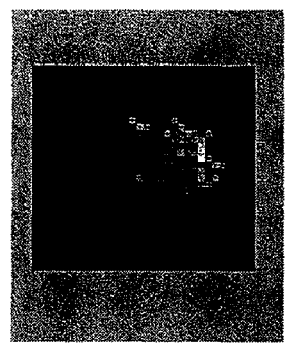
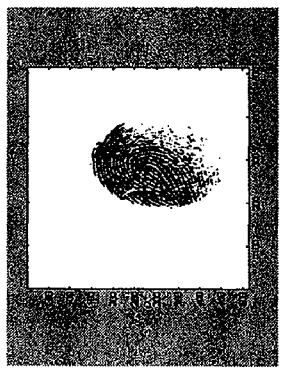
FIG. 6
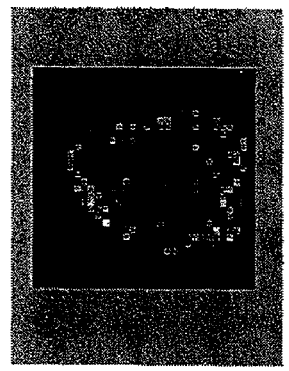
FIG. 7

FIG. 8: Effect of morphology technique: (i) Original image; (ii) Dry and wet blocks on original image; (iii) Dry and wet blocks after modification (reduced number of poor blocks); (iv) block before operation; and (v) block after operation

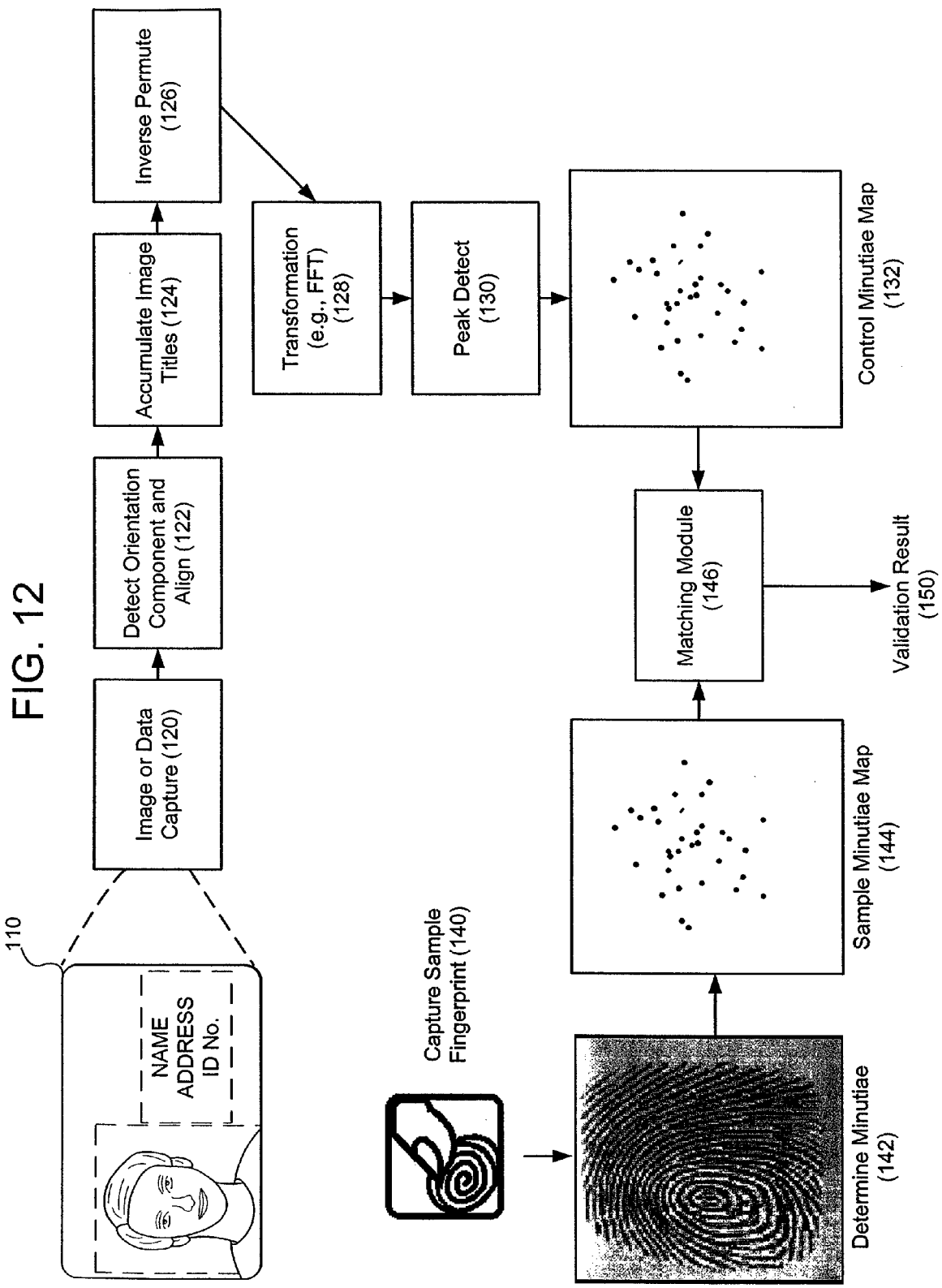

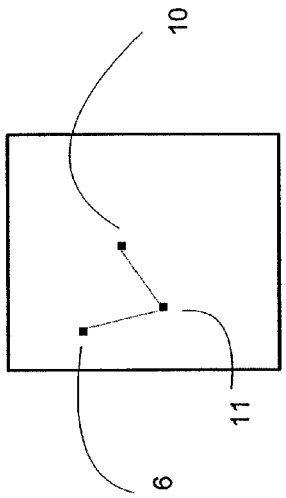
FIG. 13e
| Control | Sample |
|---------|--------|
| 1. 6    | 38     |
|    10   | 2      |
| 2. 6    | 2      |
|    10   | 38     |
|    11   | 29     |
| 3. 10   | 38     |
|    11   | 29     |
| 4. 10   | 29     |
|    11   | 38     |
FIG. 13f
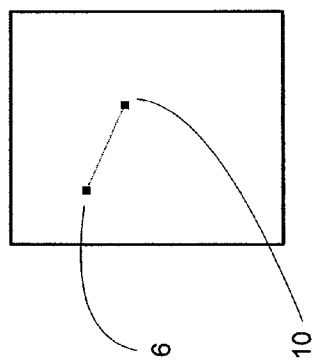
FIG. 13c
| Control | Sample |
|---------|--------|
| 1. 6    | 38     |
|    10   | 2      |
| 2. 6    | 2      |
|    10   | 38     |
FIG. 13d
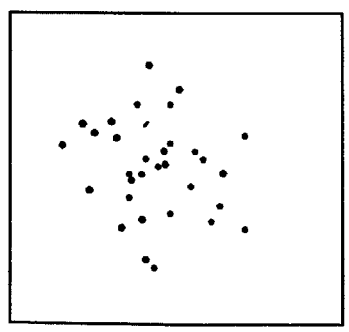
FIG. 13a
FIG. 13b

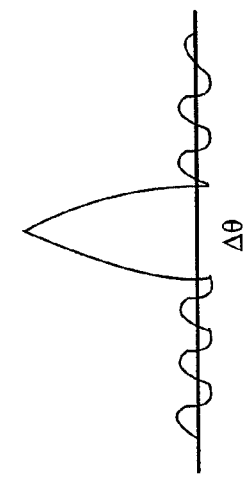
FIG. 14e
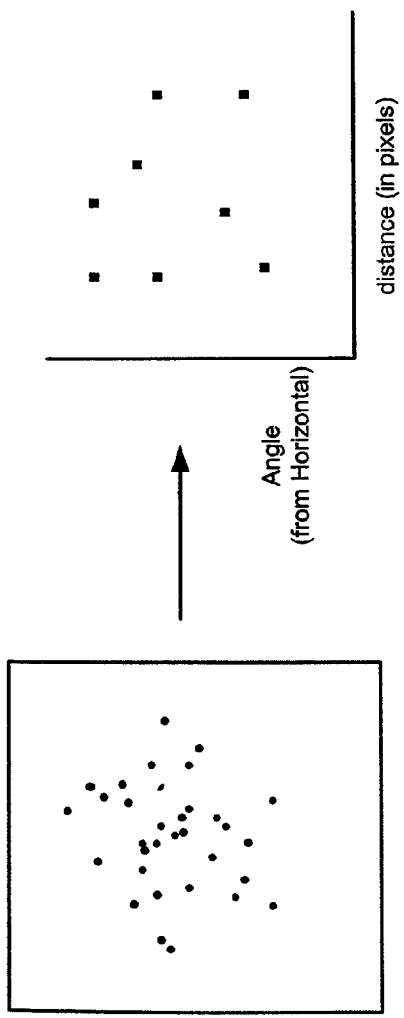
FIG. 14c
FIG. 14a
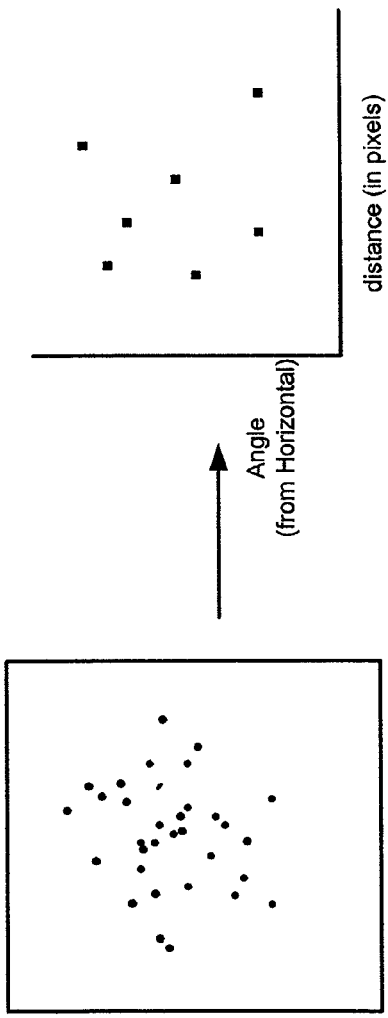
FIG. 14d
FIG. 14b

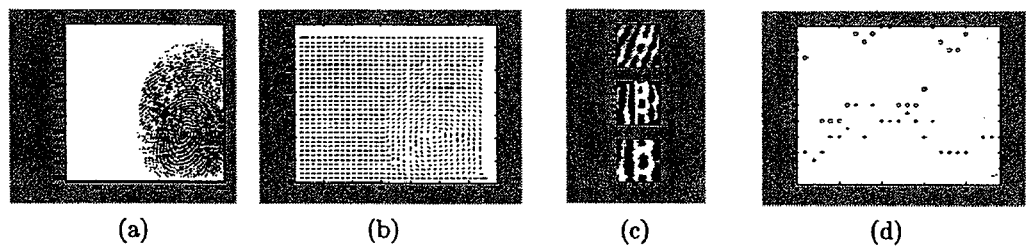
(a) (b) (c) (d)
APPENDIX A FIGS. 1
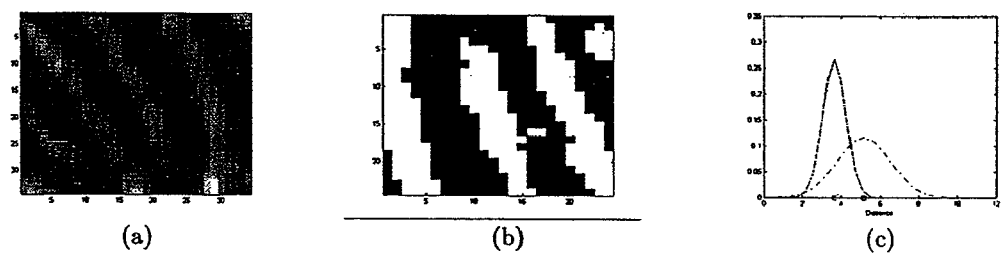
(a) (b) (c)
APPENDIX A FIGS. 2
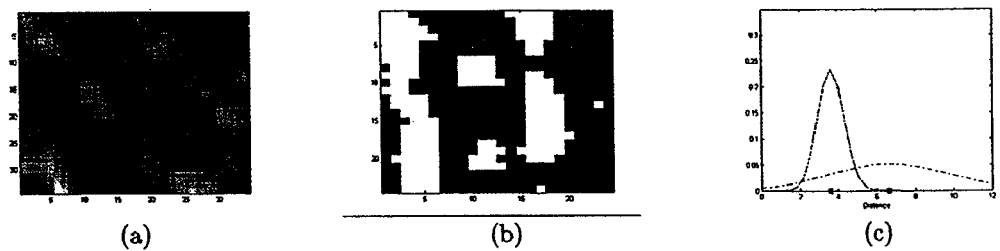
(a) (b) (c)
APPENDIX A FIGS. 3

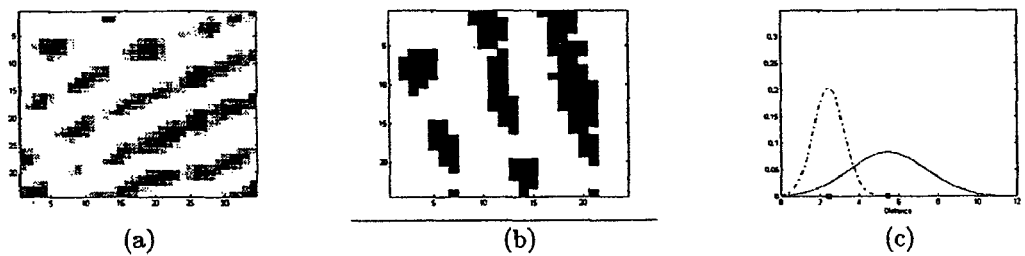
APPENDIX A FIGS. 4
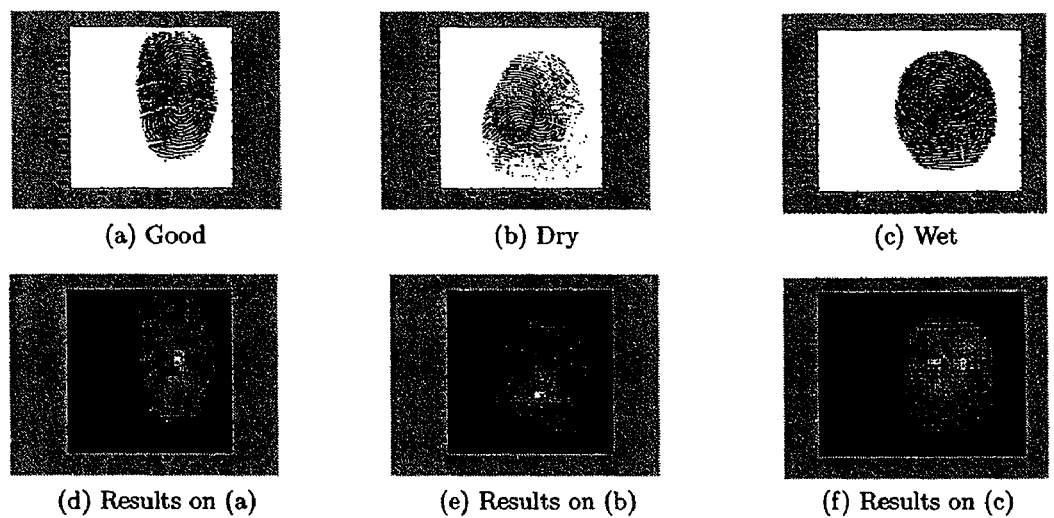
APPENDIX A FIGS. 5

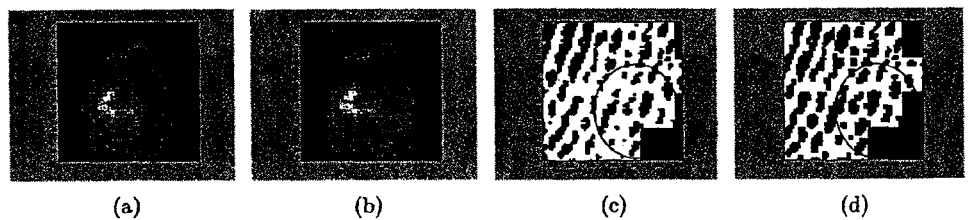
(a)     (b)     (c)     (d)
APPENDIX A FIGS. 6
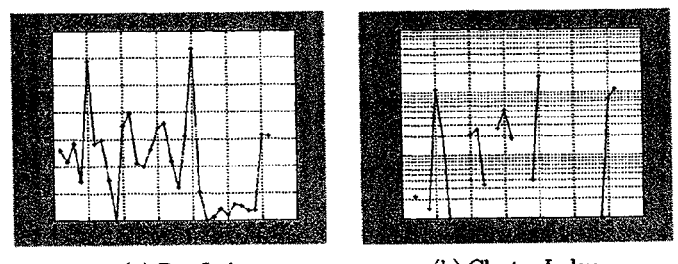
(a) Dry Index     (b) Cluster Index
APPENDIX A FIGS. 7
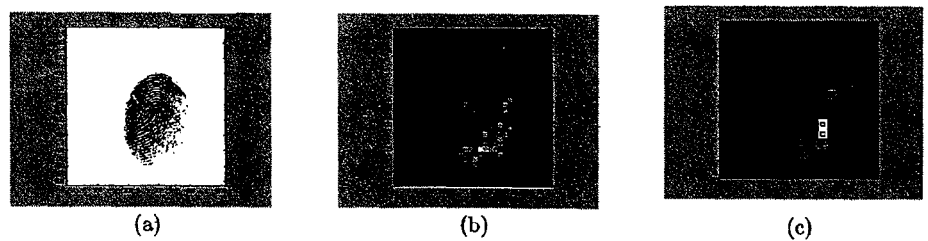
(a)     (b)     (c)
APPENDIX A FIGS. 8
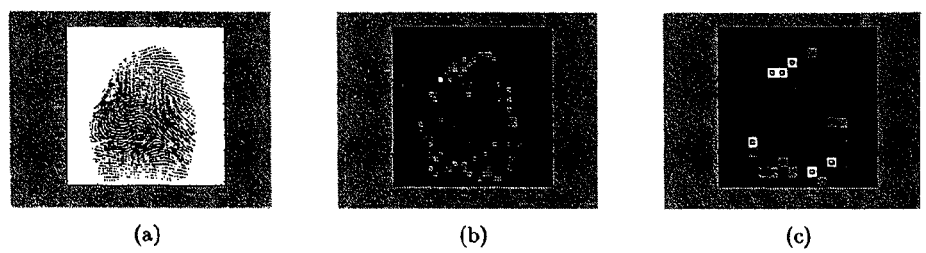
(a)     (b)     (c)
APPENDIX A FIGS. 9

STATISTICAL QUALITY ASSESSMENT OF FINGERPRINTS

RELATED APPLICATION DATA

This application is a continuation application of U.S. patent application Ser. No. 10/913,015, now U.S. Pat. No. 7,489,807, filed Aug. 6, 2004, which in turn claims the benefit of U.S. Provisional Patent Application Nos. 60/493,690, filed Aug. 7, 2003, and 60/557,856, filed Mar. 26, 2004. This application is also related to the following U.S. Pat. Nos. 5,841,886, 6,343,138 and 6,389,151 and assignee's U.S. patent application Ser. No. 10/893,141, filed Jul. 15, 2004. Each of the above patent documents is herein incorporated by reference.

TECHNICAL FIELD

The present invention relates generally to fingerprints (e.g., human fingerprints). One aspect of the invention assesses the quality of fingerprints. Another aspect of the invention embeds so-called fingerprint minutiae with a digital watermark.

BACKGROUND AND SUMMARY

Biometrics is a science that can be used to measure and analyze physiological characteristics, such as fingerprints, eye retinas and irises, facial patterns and hand geometry. Some biometrics technologies involve measurement and analysis of behavioral characteristics, such as voice patterns, signatures, and typing patterns. Because biometrics, especially physiological-based technologies, measures qualities that an individual usually cannot change, it can be especially effective for authentication and identification purposes.

Fingerprint-based identification is one of the oldest successful biometric-based identification methods. Each person has a set of unique, typically immutable fingerprints. A fingerprint includes a series of ridges and valleys (or "furrows") on the surface of a finger. The uniqueness of a fingerprint can be determined by a pattern of ridges and furrows, as well as minutiae points. Minutiae points are local ridge characteristics that generally occur at either a ridge bifurcation or at a ridge ending.

Fingerprint matching techniques can be placed into two general categories: minutiae-based and correlation-based matching. Minutiae-based techniques first find minutiae points and then map their relative placement on the finger. Each minutiae point may include a placement location (e.g., an x, y coordinate in an image or spatial domain) and a directional angle. (The curious reader is directed to, e.g., U.S. Pat. Nos. 3,859,633 and 3,893,080, both to Ho et al., which discuss fingerprint identification based upon fingerprint minutiae matching. Each of these patent documents is herein incorporated by reference.) The National Institute of Standards and Technology (NIST) distributes public domain software for fingerprint analysis. The software is available from the Image Group at NIST under the name NIST FINGERPRINT IMAGE SOFTWARE (NFIS), which includes a minutiae detector called, MINDTCT. MINDTCT automatically locates and records ridge ending and bifurcations in a fingerprint image (e.g., identifies minutiae locations). NFIS also includes a pattern classification module called PCASYS.

Correlation techniques correlate normalized versions of fingerprint images to determine if a first fingerprint image (control) matches a second fingerprint image (sample). (The curious reader is direction to, e.g., U.S. Pat. Nos. 6,134,340 and 5,067,162, which discuss correlation techniques even further. Each of these patent documents is herein incorporated by reference.).

Other fingerprinting efforts have focused on locating or analyzing the so-called fingerprint "core". U.S. Pat. No. 5,040,224 to Hara discloses an approach for preprocessing fingerprints to correctly determine a position of a core of each fingerprint image for later matching by minutiae patterns. U.S. Pat. No. 5,140,642 to Hsu et al. is directed to a method for determining the actual position of a core point of a fingerprint based upon finding ridge flows and assigning a direction code, correcting the ridge flows, and allocating the core point based upon the corrected direction codes. Each of these patents is herein incorporated by reference.

Despite the work in the prior art, there are still problems to be solved, and improvements to be made. For example, quality of an original fingerprint image can be poor—due to imaging issues or physical conditions (e.g., wetness, dryness, etc.) when sampling a fingerprint. When fingerprint quality is poor, the print may contain local ridge pattern distortion, which may result in an incorrect analysis of the fingerprint.

Accordingly, one inventive aspect of the invention provides a method to assess the quality of fingerprint images using local statistics of a captured fingerprint. Assessing the quality of a fingerprint is vital, e.g., to determine whether a fingerprint should be recaptured or whether a fingerprint image should be modified or enhanced.

This disclosure also includes systems and methods for hiding fingerprint minutiae information in a photographic image (e.g., a photograph carried by an ID document). The fingerprint minutiae information is represented as a so-called digital watermark component.

Digital watermarking is a process for modifying physical media or electronic signals to embed a machine-readable code into the media or signals. The media or signals may be modified such that the embedded code is imperceptible or nearly imperceptible to the user, yet may be detected through an automated detection process.

Digital watermarking systems typically have two primary components: an encoder that embeds the watermark in a host signal, and a decoder that detects and reads the embedded watermark from a signal suspected of containing a watermark (a suspect signal). The encoder embeds a watermark by altering the host signal. The reading component analyzes a suspect signal to detect whether a watermark is present. In applications where the watermark encodes information, the reader extracts this information from the detected watermark. Several particular watermarking techniques have been developed. The reader is presumed to be familiar with the literature in this field. Some techniques for embedding and detecting imperceptible watermarks in media signals are detailed in assignee's U.S. Pat. Nos. 5,862,260 and 6,614,914. Each of these patent documents is herein incorporated by reference.

Further features and advantages will become even more apparent with reference to the following detailed description and accompanying drawings.

BRIEF DESCRIPTION OF THE DRAWINGS

FIG. 1 is a diagram illustrating fingerprint capture.

FIGS. 5a-5c show typical Gaussian distributions for fingerprint image blocks having three different qualities, i.e., good, wet and dry, respectively.

FIGS. 6 and 7 each illustrate two different fingerprint images, with each image having a different population density of poor image blocks, while each image includes about the same number of poor image blocks.

FIG. 12 illustrates a method for validating the identification document shown in FIG. 11.

FIGS. 13a-13f illustrate a method for minutiae-matching.

FIGS. 14a-14e illustrate an alternative method for minutiae-matching.

Appendix A FIGS. 1a-d illustrate, respectively, a fingerprint image, a global directional map, a block orientation and a measured thickness.

Appendix A FIGS. 2a-2c illustrate for a good fingerprint, respectively, a fingerprint image, a rotated black/white image, and a Gaussian PDF of line thickness.

Appendix A FIGS. 3a-3c illustrate for a wet fingerprint, respectively, a fingerprint image, a rotated black/white image and a Gaussian PDF of line thickness.

Appendix A FIGS. 4a-4c illustrate for a dry fingerprint, respectively, a fingerprint image, a rotated black/white image, and a Gaussian PDF of line thickness.

Appendix A FIGS. 5a-5c illustrate, respectively, good, dry and wet fingerprints, while Appendix A FIGS. 5d-5f illustrates, respectively, detected poor quality blocks for the fingerprints shown in FIGS. 5a-5c.

Appendix A FIGS. 6a-6d illustrates detected dray blocks before and after morphology; specifically, FIG. 6a shows a fingerprint with dry blocks without morphology; FIG. 6b shows a number of dry block in the FIG. 6a fingerprint after morphology; FIG. 6c shows a close up of a dry block; and FIG. 6d shows a close up of the FIG. 6c block after morphology.

Appendix A FIGS. 7a-7b show a Dry index and a corresponding Cluster Index.

Appendix A FIGS. 8a-8c illustrate, respectively, a fingerprint image, the number of detected dry blocks within the image, and a group of dry blocks marked with a square.

Appendix A FIGS. 9a-9c illustrate, respectively, a fingerprint image, the number of detected dry blocks and a group of dry blocks marked with a squares.

DETAILED DESCRIPTION

Statistical Quality Assessment of Fingerprints

Figure 2A:
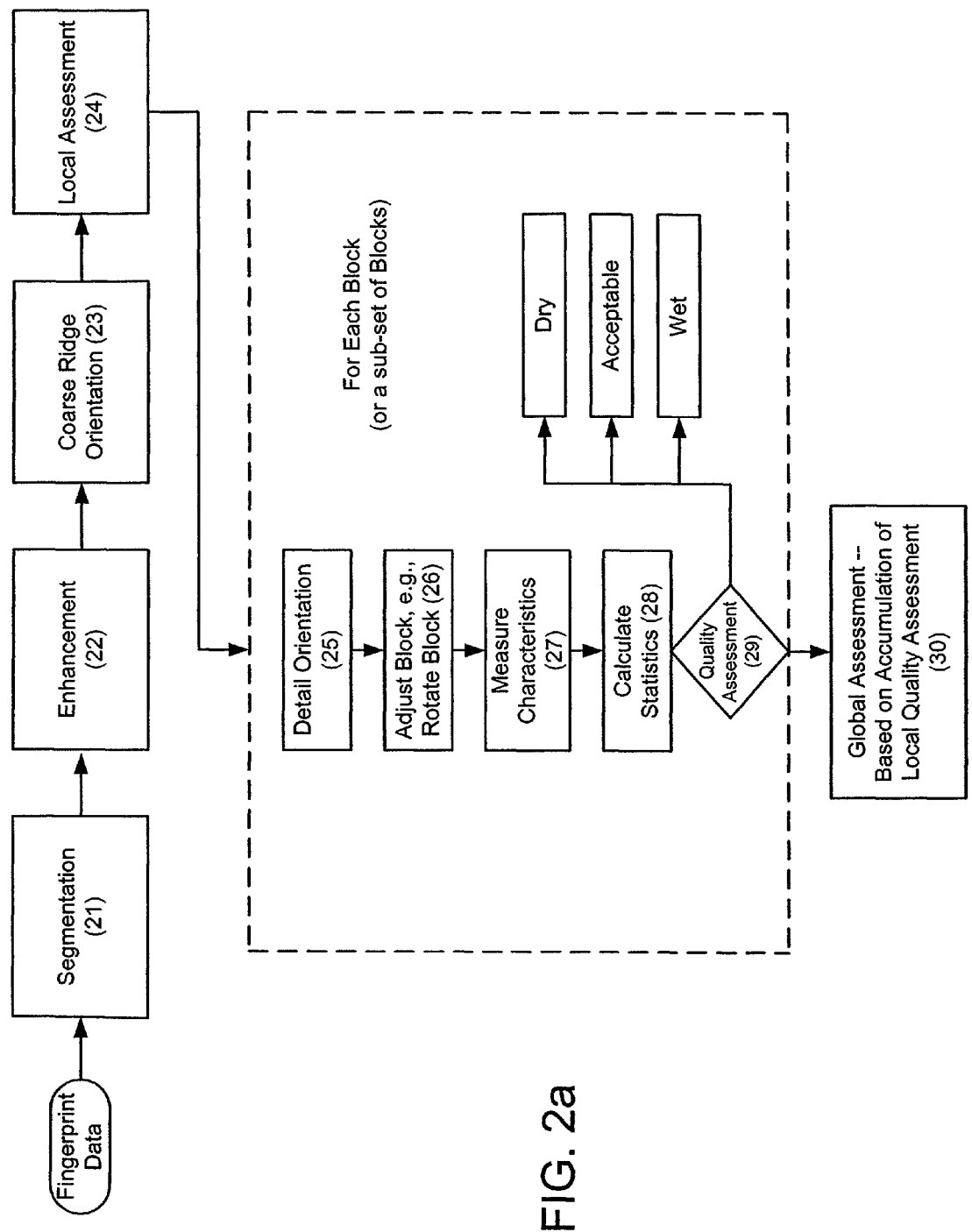
FIG. 2a is a diagram illustrating quality assessment for fingerprints.

This section provides methods and systems to assess the quality of a fingerprint image using characteristics associated with the image or with the underlying fingerprint. In one implementation the characteristics include local statistics. By using the term "local statistics" we generally mean those statistics that are attributable to a particular image sub-region, like a 24-by-24 pixel block or 32-by-16 pixel block, etc., or statistics that are attributable to a group of image sub-regions. Determining quality of a fingerprint image is significant for a number of reasons. For example, a reference fingerprint image, e.g., which is stored in a database, may not be readily matched against a sample fingerprint if either have poor quality or distortion. Poor quality or distortion may be caused from a number of problems including, e.g., a fingerprint being too "wet" or too "dry", image scanner distortion, too much ink, etc.

Fingerprint capture is discussed with reference to FIG. 1. A human subject presents her finger to be sampled (e.g., the subject is "fingerprinted"). It should be appreciated that the term "fingerprint" is used in its broadest context in this patent document, so as to include fingerprints, thumbprints and even palm prints. A fingerprint reader or scanner captures an image of the subject's fingerprint. Suitable fingerprint readers are provided by a number of companies, including Indentix, headquarter in Minnetonka, Minn., USA, under the product names of DFR® Professional Direct Fingerprint Readers (e.g., DFR 90, DFR 2080 and DFR 2090). Specifications for the DFR 2090 are summarized in Table 1, below. Of course, there are many other fingerprint readers that can be suitably interchanged with this aspect of the invention. A fingerprint reader often provides a fingerprint image, e.g., a 512×512 pixel image.

TABLE 1

DFR 2090 Specifications:

| Features: | Comments or Values: |
|---|---|
| Resolution | 500 dpi × 500 dpi +/− 3%, when sampled at 12.2727 MHz, Gray Scale 256 shades of gray |
| Platen Active Area | 0.8 × 1.0 inches (20 mm × 25 mm) |
| Output | USB Version 1.1, 12 Mbps transfer rate; USB Connector: Type A Female Analog Output+: RS-170, BNC connector Analog Output Signal: 0.7 volt p-p +/− 0.05 v into 75 ohm termination |
| Distortion | less than 1.0% trapezoid |

(As an alternative fingerprint image capture method, a human subject inks her finger and then "rolls" her inked finger over a substrate—transferring her fingerprint to the substrate via the ink. An optical reader (e.g., a flatbed scanner) images the inked substrate to capture an image of the rolled fingerprint.).

We assess the quality of a captured fingerprint image. Our preferred method and system analyzes statistical properties in a local fingerprint area, which involves, e.g., the average and spread (i.e., standard deviation) of the thickness of both fingerprint ridges and fingerprint valleys. In FIG. 1, a "ridge" is shown as black, and a "valley" between two ridges is represented by white space or as a void. Thickness can be measured in terms of pixels or in terms of a predetermined unit.

With reference to FIG. 2a, captured fingerprint data is optionally segmented (step 21) and enhanced (step 22). These steps, while not necessary to practice the invention, help reduce image noise. For example, the segmentation step 21 removes unwanted background noise and clutter (e.g., removes noise introduced by an optical reader) from the fingerprint itself. The enhancement (e.g., a non-linear, medium filter) can also remove noise. Ridge orientation for the fingerprint image is determined in step 23. (In some implementations, we obtain the ridge orientation from NIST's NFIS software, particularly the "rors( )" function in the PCASYS module. In other implementations we perform a pattern recognition or orientation analysis to determine whether the fingerprint image includes distortion.). The ridge orientation gives an indication of whether the fingerprint image includes geometric distortion (e.g., rotation, scale, skew, etc.). This indication can be used to compensate for such distortion, if needed. A local fingerprint image area (e.g., 24-by-24 pixel block, etc.) is selected for analysis in step 24. This selected image block area is also referred to as a "selected block."

We preferably perform a detailed orientation analysis for the selected image block in step 25. This detailed orientation step determines distortion that may be specific to or localized in the selected local image block. For example, a lower left image area may have more distortion than an upper right image area. (The NFIS software provides a detail orientation indication, i.e., the "Dft_dir_powers( )" function in the MINDTCT module. Of course, other techniques can be suitable interchanged with this aspect of the invention to determine a local detail orientation, e.g., area comparison or orientation metrics, etc.) Geometric registration is performed in steps 26. For example, the selected image block is rotated to compensate for the global distortion identified in step 23 and/or adjusted to compensate the localized distortion identified in step 25. Each local block is preferably adjusted or rotated so that lines are scanned about normal to the ridge orientation. (We note that this registration or adjustment step 26 alternatively can be performed in multiple stages, with, e.g., global distortion being compensated for prior to block selection or after block selection but prior to localized block compensation. Alternatively, the global and detail indicators (e.g., rotation angles) can be combined to yield a compensation metric, which is used to adjust a selected image block.)

After image adjustment, we determine ridge and valley characteristics for the selected block in step 27. In one implementation we measure the thickness (or width) of ridges and valleys, e.g., in terms of pixels per horizontal scan line. (We can distinguish between a ridge and valley based on color or grayscale level. For example, in a bitonal image, ridges are black and valleys are white. The number of pixels for a ridge (black pixels) is counted and the numbers of pixels for valleys (white pixels) are counted. In the case of a grayscale image, we threshold the grayscale pixel values so a ridge is identified as a ridge if the ridge includes a grayscale value at or above a predetermined grayscale value (e.g., grayscale value >128). In still another implementation we binarize the grayscale image to classify a ridge or valley. A threshold value for binarization can be an average value in a local block.).

Figure 3:
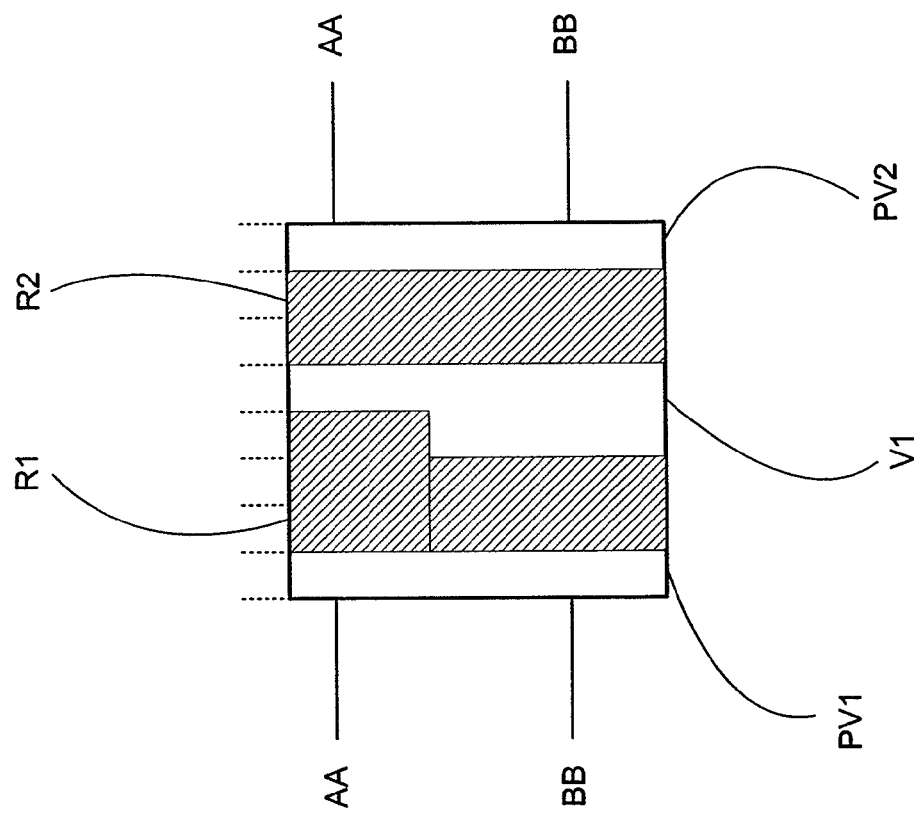
FIG. 3 is a diagram illustrating ridge and valley thickness in a fingerprint image block.

With reference to FIG. 3, we show a simplified example of an 8-by-8-pixel block including two ridges R1 and R2 (shown with hash marks) and one valley V1 (white or void space). The dotted lines across the top of the block are provided to show a separation between individual pixels. For simplicity, the widths of only two scan lines are considered, i.e., along scan lines AA and BB. Along the AA line, ridge R1 includes a length of 3 pixels, while ridge R2 includes a length of 2 pixels. Valley V1 is 1 pixel wide along the AA line. Along the BB line, each ridge R1 and R2 is 2 pixels wide, and valley V1 is 2 pixels wide. Of course, this example is not meant to be limiting. In practice, the number of scan lines will vary, e.g., up to one scan per pixel row, the block size will vary even perhaps to include irregular selected image areas and the number and widths of the ridges and valleys will certainly vary according to individual biometric characteristics. (We note that the FIG. 3 representation includes two partial valleys PV1 and PV2 along the block edges. We preferably exclude partial ridges and partial valleys from local block analysis. However, in alternative implementations, partial ridges and/or valleys are considered and accounted for when determining local block statistics. In some of these alternative implementations we measure partial ridges and valleys and add that measurement to a neighboring block. For example, we add the measurements from a partial valley or ridge to measurements from a corresponding partial ridge or valley in a neighboring block. Or a partial ridge or valley can be weighted so as to be less significant as compared to a complete ridge or valley. In other implementation we select a block or image area based on ridge or valley boundaries, ensuring that a block does not include partial ridges or partial valleys.)

Returning to FIG. 2a, once the ridge and valley characteristics are determined for a selected image block, we determine local statistics (step 28) for the selected blocks based on the characteristics (e.g., ridge and valley widths and/or relationships). For example, we calculate the average width of both the ridges and valleys, and the spread (i.e., standard deviation, or "σ") of both the ridges and valleys. Spread provides an indication of the regularity of ridges and valleys. Using the example shown in FIG. 3, the average width (along the scan lines AA and BB) of the ridges is 2.25 pixels and the average width (along the scan lines AA and BB) of the valley is 1.67 pixels. The standard deviation for the ridges is 0.5, while the standard deviation of the valley is 0.41.

The local statistics are used to determine a classification for a selected block (step 29). For example, the block can be classified as, e.g., good, marginal and poor. Or the block can be classified as good (or acceptable), wet and dry. A wet fingerprint, where the ridges are dominant, typically includes an average ridge thickness ($\mu_b$) that is larger than the valley thickness ($\mu_w$), and vice versa in case of a dry fingerprint. We have found that a good fingerprint image (e.g., FIG. 5a) tends to have small standard deviation values for thickness for both ridges and valleys. If a fingerprint is wet (FIG. 5b), the mean of ridges (dotted line) is larger than that of the valleys (solid line). FIG. 5b also shows that for a typical wet fingerprint, the standard deviation of the ridges is relatively large. The opposite result is shown if a fingerprint is dry (see FIG. 5c—where the dotted line corresponds with rides and solid line corresponds with valleys). Of course other statistical factors can be used when determining a classification of a selected block. In one implementation we use the following statistics to classify or assess blocks:

To classify a block as a dry block: (standard deviation of valley >1.5 pixels) & (mean of valley>mean of ridge);

To classify a block as a wet block: (standard deviation of ridge >1.5 pixels) & (mean of valley<mean of ridge); and Otherwise the block can be classified as acceptable.

Of course, these classification values and relationships can be varied in different implementations according to accuracy needed.

We cache (or otherwise remember) the quality assessment for the selected block. In some implementations we associate the quality assessment with a spatial image location. For example, we create a spatial map of quality assessments for a fingerprint image.

Steps 25 through 29 are repeated for each block of the fingerprint image. (In an alternative implementation, we repeat the process only for a subset of image blocks, but not for all of the blocks. The predetermined number should be selected to ensure a high level of confidence when making a quality decision for a fingerprint image, or the selected blocks should correspond to a predetermined area like a core of a fingerprint.).

A global assessment regarding the quality of the fingerprint image is made in step 30. The global assessment is the arbitrator of whether the overall quality of the fingerprint image is, e.g., good, bad or poor or otherwise. In a first case, we add up the number low quality blocks (as determined, e.g., in step 29). If the number is over a predetermined threshold, the image is considered low quality. In a related case, we add up the number of acceptable quality blocks, and if the number is above (or below) a predetermined threshold we make a decision regarding the overall quality of the fingerprint image.

In an alternative global quality assessment, population density of poor blocks (or good blocks) is considered. Recall that we discussed above that in some implementations we track or record the spatial location of blocks in terms of their quality. So if the number of poor quality blocks would otherwise disqualify a fingerprint image due to poor quality, but the poor quality blocks are reasonably dispersed throughout the fingerprint image, the image may be otherwise accepted. In this alternative arrangement, taking into consideration both the number of poor block and the density of the poor blocks determines global quality of a fingerprint image. Thus a fingerprint image having poor blocks that are locally condensed may yield a lower global assessment in comparison to an image including poor blocks dispersed throughout the image. To further illustrate, FIGS. 6 and 7 have the same number of poor blocks, but are arranged in different density patterns. FIG. 6 includes a condensed population of dry blocks in the lower right portion of the fingerprint image. In comparison, the fingerprint in FIG. 7 has its dry blocks somewhat dispersed through out the image. The FIG. 7 fingerprint may have a better global assessment when compared to the FIG. 6 fingerprint. (Poor block population can be measured in terms of pixel distance measured, e.g., by Euclidean distances between groups of poor blocks, etc.)

Figure 4:
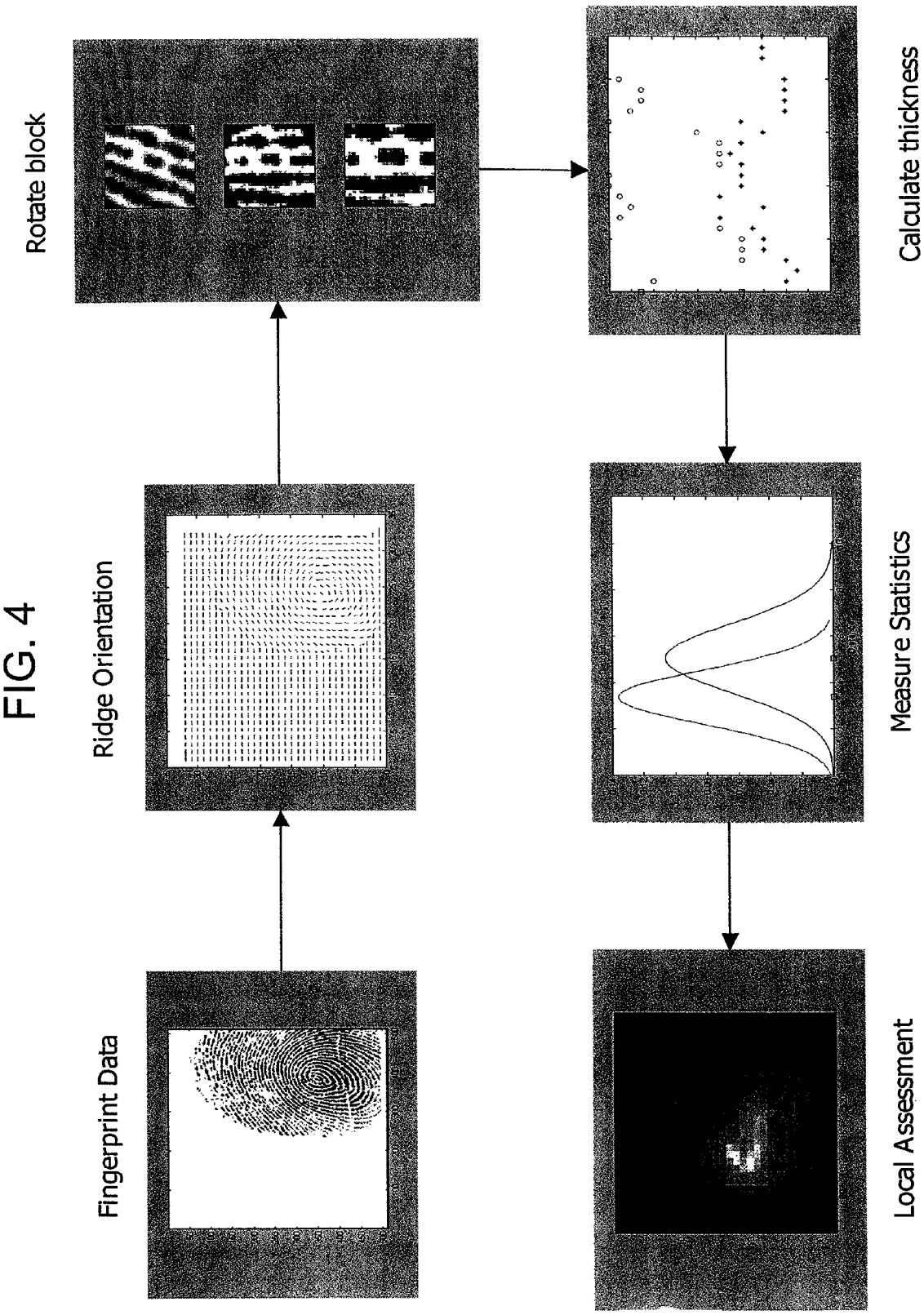
FIG. 4 is a diagram illustrating an alternative method for quality assessment of fingerprints.

FIG. 4 provides a functional block diagram showing one implementation of our quality assessment invention. Fingerprint image data is provided for analysis. Ridge orientation is determined to help compensate for geometric distortion (e.g., image rotation). As discussed with respect to other implementations, this orientation may include both global and localized distortion assessments. A selected block is rotated or otherwise adjusted to compensate for the determined distortion. Ridge and valley characteristics are determined, and local statistics (e.g., standard deviation and average width of valleys and ridges) are generated. The local statistics are accumulated for selected blocks, and a global quality assessment for a fingerprint image is determined based on the accumulation.

Figure 2B:
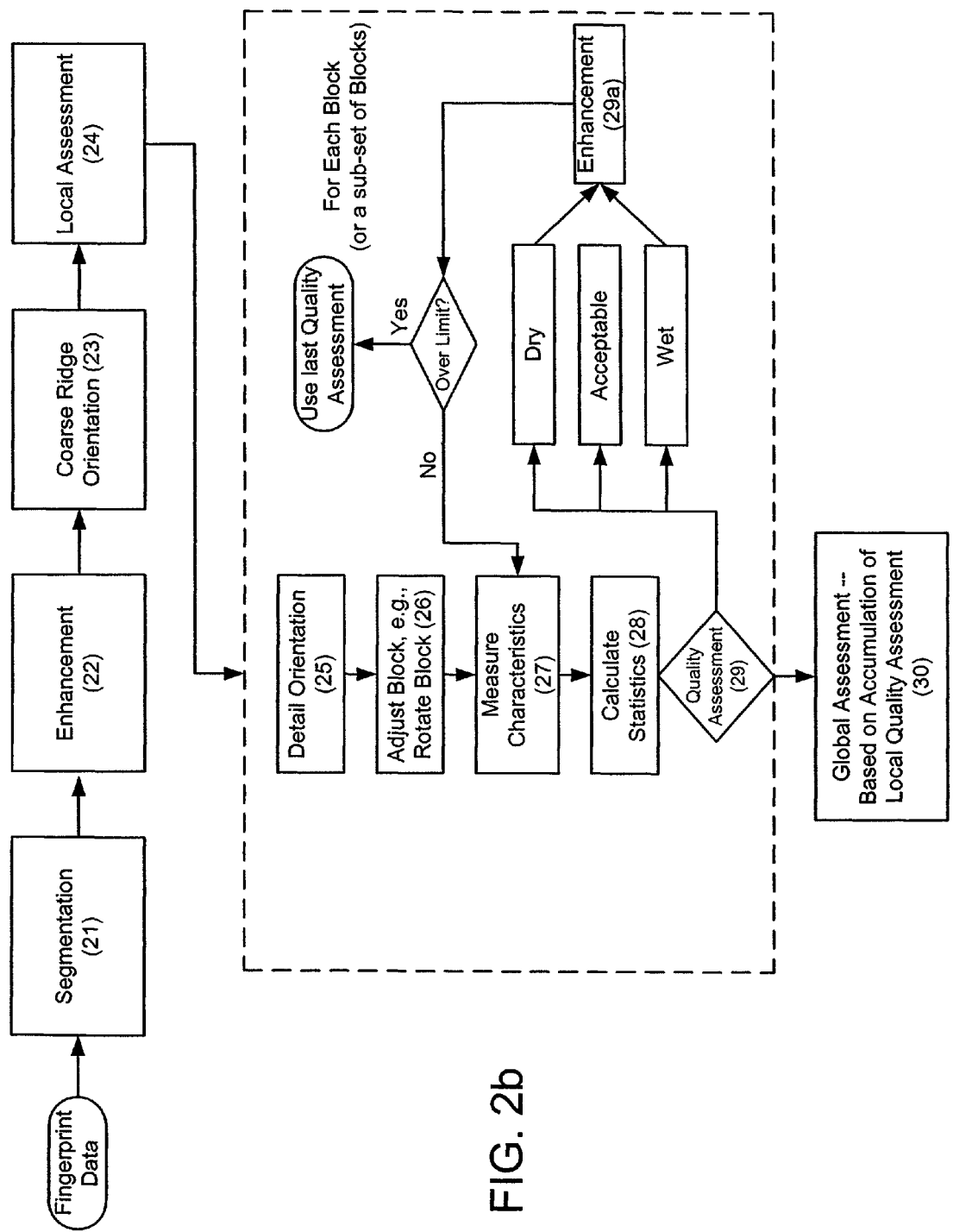
FIG. 2b is a diagram illustrating quality assessment for fingerprints including an enhancement module.
Figure 8:
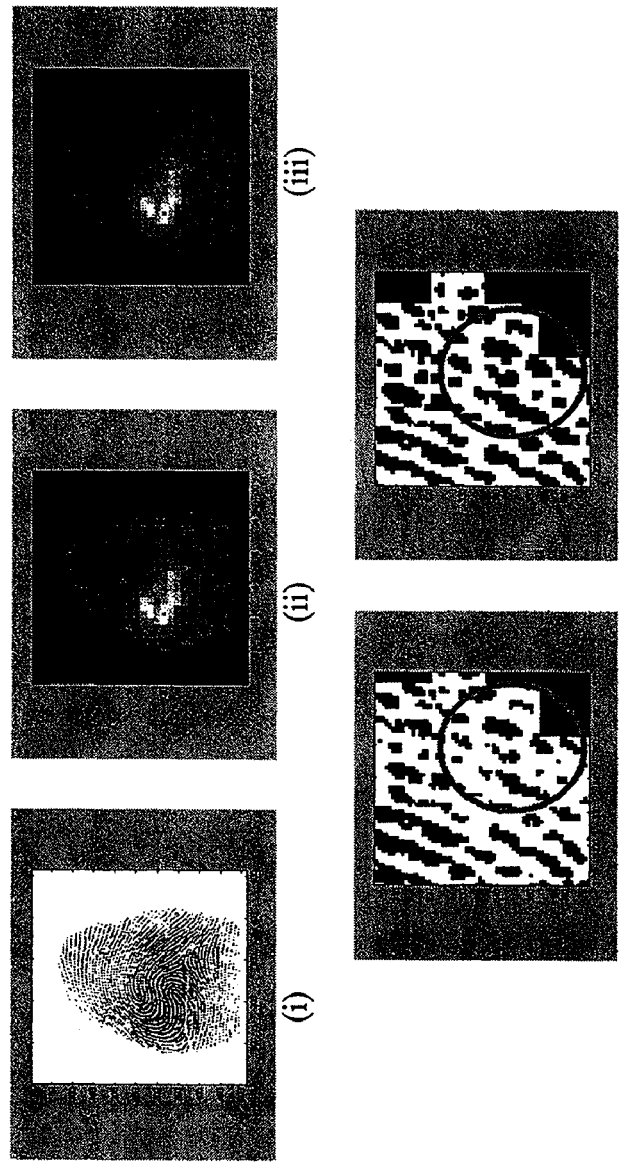
FIG. 8 illustrates results of an image enhancement technique.

With reference to FIG. 2b we provide an enhancement module to modify local blocks that are classified as being poor. For example, selected local blocks that are classified as dry or wet are modified using a morphological technique. This technique reduces or expands the width of valleys (or ridges). An erosion method is used to reduce, and a dilation method is used for expanding. In a simplistic example, a MatLab® function "erode" (or "thin") is used to reduce a valley or ridge, and a MatLab® function "dilate" (or "thicken") is used to grow a valley or ridge. Of course, other functions, programs and techniques that erode or grow ridges and valleys can be suitably interchanged with this aspect of the invention. (For simplicity of illustration, the FIG. 8 example only morphs dry blocks in the FIG. 8(i) image. FIG. 8(iii) shows the number of dry blocks is reduced in comparison to FIG. 8(ii), while the number of wet blocks remains the same as before (since the morphology operation was only performed on dry blocks). The detailed views of before and after operations are shown in FIG. 8 (iv) and (v).).

After performing the morphological operation (step 29a), the image block is preferably reevaluated. For example, flow continues back to step 27 where the ridge and valley characteristics are redetermined. (We optionally place a limiting function in the FIG. 2b implementation to determine or limit the number of times the morphological operation can be performed on a selected block, to help preserve image integrity and reduce processing time. A quality assessment of the last loop can be used when the limit is reached.).

Alternatives

In alternative implementations we adaptively select a block size to improve our quality assessment. For example, we examine a neighborhood of blocks or pixels, and based on a neighborhood metric (e.g., general assessment) we adaptively enlarge or decrease block size. Also, in some alternative implementations we determine which blocks correspond to the fingerprint's core, and we weight (or assign more value to) the core's block quality assessments so as to more significantly affect the global assessment. We can also use a frequency-based analysis of block characteristics (e.g., ridges and valleys) to weight or influence the global assessment.

Applications

We envision that our quality assessment techniques will be used in combination with identification document issuance, identification documents and biometric capture stations. For example, in identification document issuance processes, biometric data (e.g., fingerprints) are collected and perhaps replicated on the document (e.g., an image of the fingerprint is printed on the document), stored in electronic circuitry or optical memory of the identification document (e.g., smart card), printed in a machine-readable format like a 2D barcode or conveyed through a digital watermark, or stored in a database. Our quality assessment techniques can be used to ensure the quality of fingerprints introduced into such a process.

Even more information regarding some types of identification documents is provided below. Of course, the inventive techniques will improve other types of identification documents as well.

We also envision that our techniques can be used in combination with the minutiae hiding techniques discussed below. For example, we can use our quality assessment techniques as a fingerprint pre-processing step, which ensure the quality of an image prior to minutiae mining and embedding.

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and/or prior to boarding their flight. In addition, because we live in an ever-evolving cashless society, ID documents are used to make payments, access an ATM, debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards and documents described above will hereinafter be generically referred to as "ID documents" or "identification documents".

In the production of images useful in the field of identification documentation, it is oftentimes desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents. Another security advantage with centrally issued documents is that the security features and/or secured materials used to make those features are centrally located, reducing the chances of loss or theft (as compared to having secured materials dispersed over a wide number of "on the spot" locations).

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents is manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document.

OTC identification documents of the types mentioned above can take a number of forms, depending on cost and desired features. Some OTC ID documents comprise highly plasticized polyvinyl chloride (PVC) or have a composite structure with polyester laminated to 0.5-2.0 mil (13-51 .mu.m) PVC film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the print head, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the print head. The choice of laminate dictates the degree of durability and security imparted to the system in protecting the image and other data.

Figure 9:
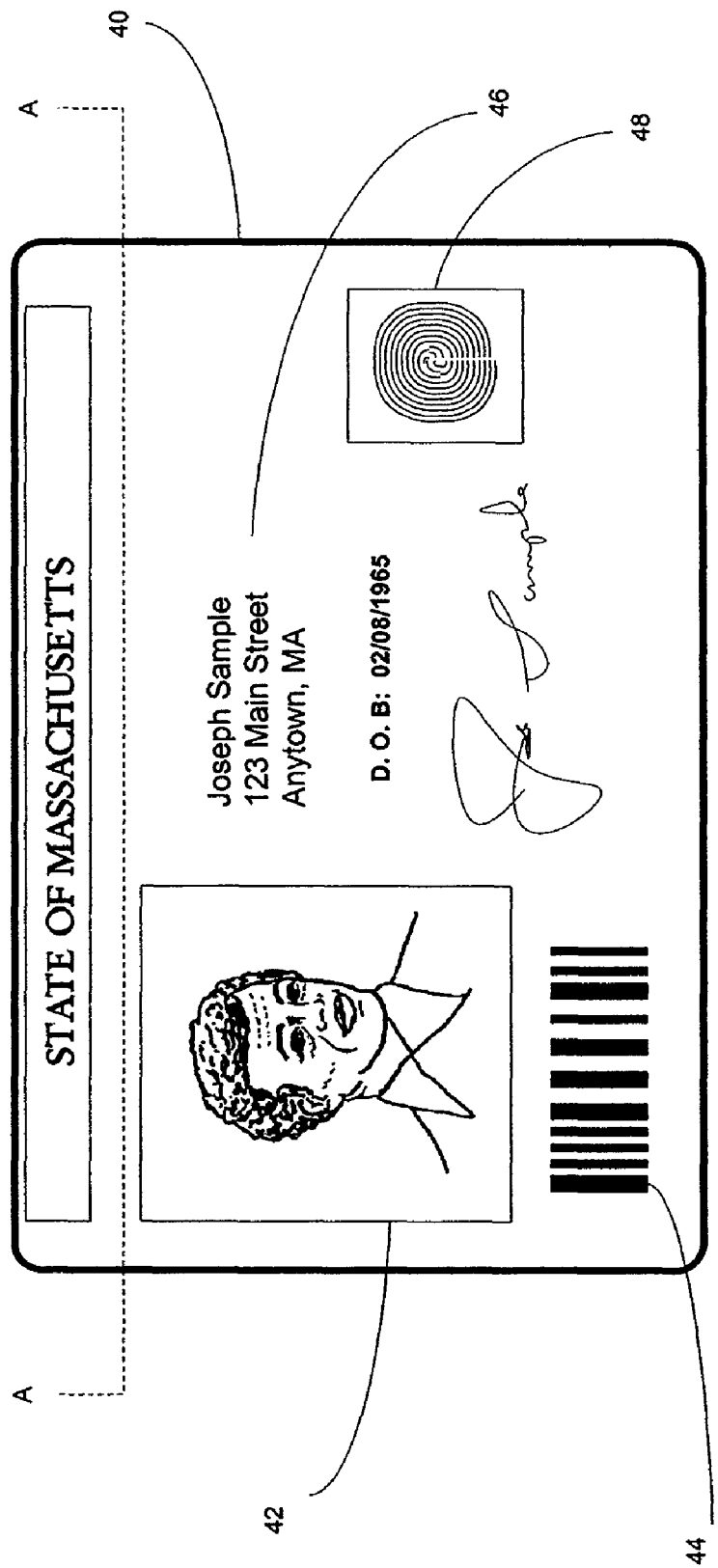
FIG. 9 illustrates an identification document.
Figure 10:
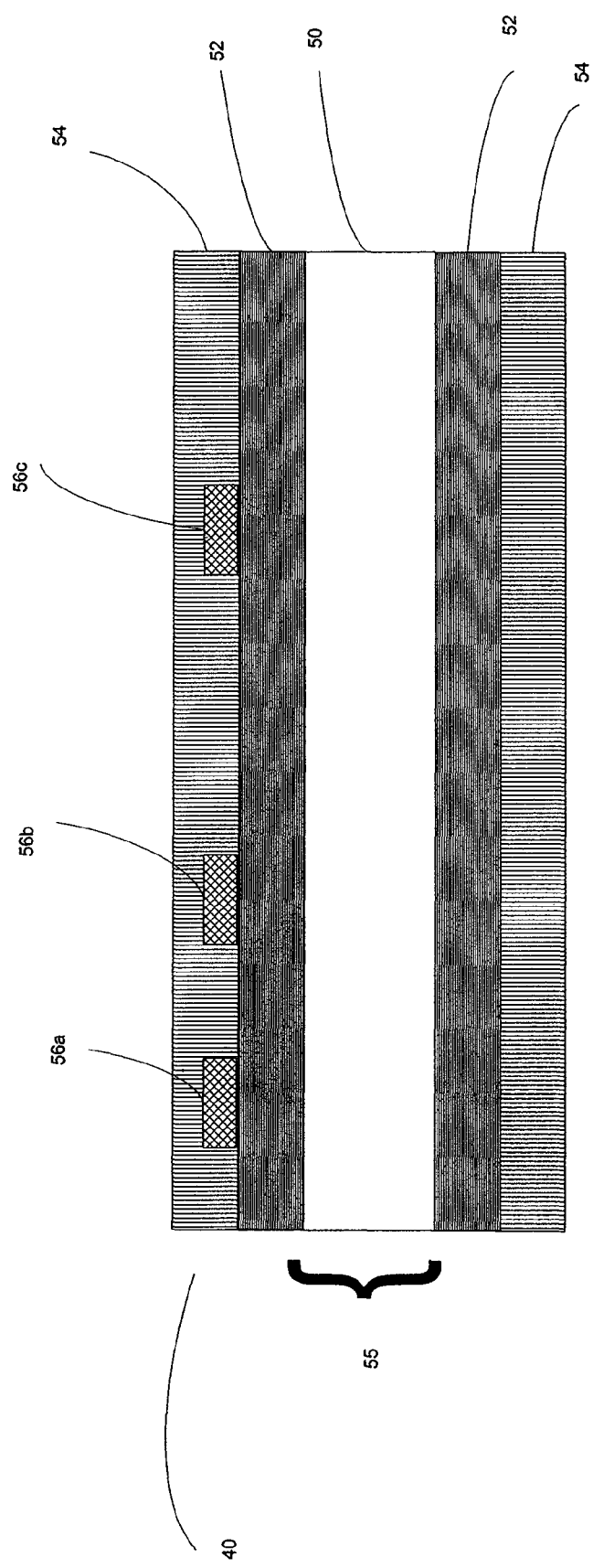
FIG. 10 illustrates a cross-sectional view of the FIG. 9 identification document.

FIGS. 9 and 10 illustrate a front view and cross-sectional view (taken along the A-A line), respectively, of an example identification (ID) document 40. Our discussion of a particular type of identification document is not meant to be limiting. Rather, our inventive techniques will apply to many different types of identification documents, systems and processes. In FIG. 9, the ID document 40 includes a photographic image 42, a bar code 44 (which may contain information specific to the person whose image appears in photographic image 42 and/or information that is the same from ID document to ID document), variable personal information 46, such as an address, signature, and/or birth date, and biometric information 48 associated with the person whose image appears in photographic image 42 (e.g., a fingerprint). Although not illustrated in FIG. 9, the ID document 40 can include a magnetic stripe or optical memory surface (which, for example, can be on the rear side (not shown) of the ID document 40), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 10, the ID document 40 comprises a pre-printed core 50 (such as, for example, white polyvinyl chloride (PVC) material) that is, for example, about 25 mil thick. The core 50 is laminated with a transparent material, such as clear PVC material 52, which, by way of example, can be about 1-5 mil thick. The composite of the core 50 and clear PVC material 52 form a so-called "card blank" 55 that can be up to about 30 mils thick. Information 56a-c is printed on the card blank 55 using a method such as Dye Diffusion Thermal Transfer ("D2T2") printing (described further in U.S. Pat. No. 6,066,594, which is incorporated hereto by reference.) The information 56a-c can, for example, comprise an indicium or indicia, such as the invariant or nonvarying information common to a large number of identification documents, for example the name and logo of the organization issuing the documents. In some implementations the information 56a-c includes a digital watermark, perhaps carrying watermark minutiae information as discussed below. The information 56a-c may be formed by any known process capable of forming the indicium on the specific core material used.

To protect the information 56a-c that is printed, an additional layer of overlaminate 54 can be coupled to the card blank 55 and printing 56a-c using, for example, 1 mil of adhesive (not shown). The overlaminate 54 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

Because ID document 40 can be used to enable and facilitate personal identification, it often is desirable to manufacture the ID document 40 in a manner to deter counterfeiting and/or fraudulent alteration. There are a number of known ways to increase the security of ID documents 40, including methods that incorporate additional information or security features and methods that adapt existing information on the card to help prevent or make evident fraud. For example, numerous types of laminations have been employed in which the information-bearing surface is heat or solvent-laminated to a transparent surface. The materials for and the process of lamination are selected such that if an attempt is made to uncover the information-bearing surface for amendment thereof, the surface is destroyed, defaced or otherwise rendered apparent the attempted intrusion.

Conveying Fingerprint Minutiae with Digital Watermarks

We have developed a method and system to improve authentication and validation techniques using fingerprints (i.e., human fingerprints). Our inventive techniques are readily applied to identification documents and biometric systems, e.g., biometric-controlled access, database verification, etc., etc., which use fingerprints for authentication or validation. In one implementation, we validate an identification document such as a drivers license, passport, photo ID, visa, credit or bank card, security card, national identification document, voter registration card or document, immigration document, permit, certificate, employment badge, secure access card or document, etc., etc. Of course, some of these identification documents may also include electronic circuitry, e.g., a smart card. (See, e.g., assignee's U.S. patent application Ser. No. 09/923,762 (published as US 2002-0080994 A1), Ser. No. 10/282,908 (published as US 20030128862 A1), and Ser. No. 10/465,769 (published as US 2003-0210805 A1) for additional examples of how digital watermarks can interact with smart cards. Each of these patent documents is herein incorporated by reference.) Other identification documents include so-called optical memory, e.g., a LaserCard provided by LaserCard Systems Corporation in Mountain View, Calif., or magnetic memory. These types of documents are interchangeably referred to as "ID documents" or "identification documents." Our techniques can also be used to determine whether a bearer of an ID document is an authorized bearer of the ID document.

Our inventive techniques match fingerprint characteristics between a control fingerprint and a sample fingerprint. A control fingerprint, or data representing a control fingerprint or a subset of the control fingerprint, can be stored or carried by an identification document. For example, a control fingerprint can be printed on an identification document or can be stored in electronic or optical/magnetic memory. In more preferred implementations, we steganographically hide fingerprint data on or in an ID document. Our preferred form of steganography is digital watermarking.

Fingerprint characteristics take many forms, and our comparison between a control and sample fingerprint may use different types of characteristics. To simplify the discussion, however, we focus on fingerprint minutiae. As discussed above, fingerprint minutiae refer to feature points usually identified at ridge endings and bifurcations in a fingerprint. Each minutiae point generally includes a placement location (e.g., an x,y spatial or image placement coordinate) and a directional angle.

One prior work involving human fingerprints and digital watermarks is "Hiding Fingerprint Minutiae in Images," Jain and Uludag in: *Proc. of Third Workshop on Automatic Identification Advanced Technologies (AutoID)*, pp. 97-102, Tarrytown, N.Y., Mar. 14-15, 2002, which is herein incorporated by reference (hereafter "Jain"). Jain contemplates embedding a minutiae point's x coordinate, y coordinate, and direction as a 9-bit number, for a total of 27 bits per minutiae point. Jain proposes to embed approximately 25 minutiae points in an image (roughly 675 bits), although a typical fingerprint has 100-200 minutiae.

Jain's technique requires a large payload capacity watermark. Such a large payload may impose practicality issues, e.g., resulting in visibility artifacts, given real world constraints when manufacturing ID documents.

Our approach, in contrast to Jain's, embeds fingerprint minutiae data (e.g., minutiae point locations and perhaps a direction indicator) explicitly as a digital watermark component. The minutiae data can be embedded in a photographic image, background, graphic, ghost image, seal, data or biometric data stored in optical or electronic memory. In a preferred implementation the minutiae data is conveyed in a manner similar to a so-called digital watermark orientation component. The explicit mapping of minutiae points, once decoded from the digital watermark, can be compared to a sample fingerprint for authentication or validation.

For more details on embedding an image watermark, and detecting and reading the image watermark from a digitized version of the image after printing and scanning see, e.g., assignee's U.S. Pat. Nos. 5,862,260 and 6,614,914, which are each herein incorporated by reference.

In order to make a watermark more robust to geometric distortion (e.g., scaling, rotation, etc.), a watermark may include an orientation watermark signal component. Together, the watermark message signal and the orientation watermark signal form the watermark signal.

One type of watermark orientation signal is an image signal that comprises a set of impulse functions in a transform domain, like a Fourier magnitude domain, e.g., each with pseudorandom phase. To detect rotation and scale of a watermarked image (e.g., after printing and scanning of the watermarked image), a watermark decoder converts the watermarked image to the Fourier magnitude domain and then performs, e.g., a log polar resampling of the Fourier magnitude image. A generalized matched filter correlates a known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal, if any.

We combine fingerprint minutiae point locations (e.g., a minutiae mapping or "grid" of such locations) with a watermark orientation signal. This minutiae mapping can be referred to as a "minutiae map" or "minutiae grid," which are used interchangeably in this patent document. An embedded minutiae grid can be recovered from an image signal. In some cases, a watermark orientation signal, which is also embedded in the image signal, is used to synchronize or register the image signal (e.g., compensate for scaling, rotation, and translation of the image signal). While we discuss, below, adding a minutiae data to an image in a spatial domain, our invention is not so limited. Explicit minutiae grid points can be added to an image signal in a transform domain as well.

Figure 11:
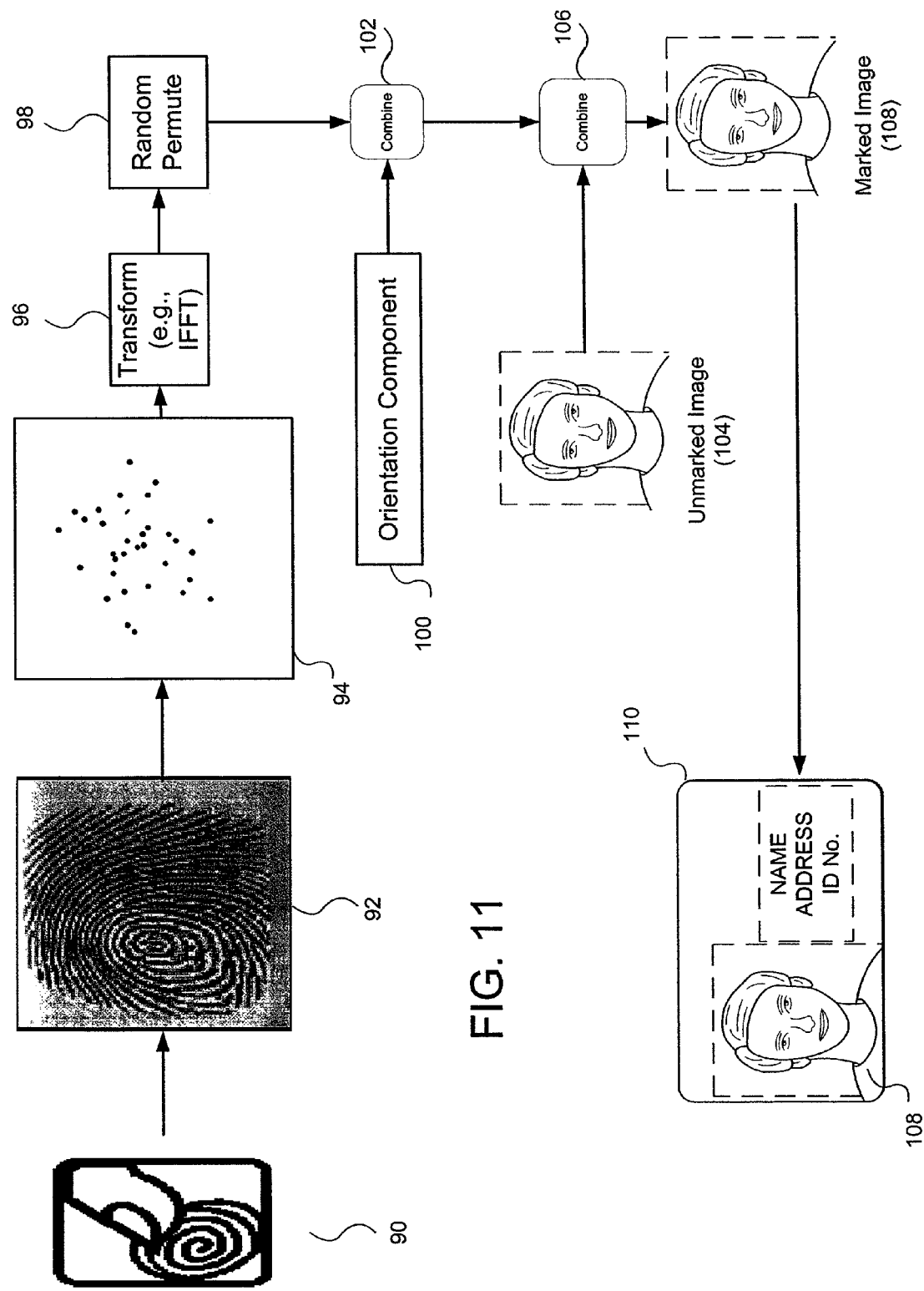
FIG. 11 illustrates a method for embedding fingerprint minutiae data into a photographic (or other) image for placement on an identification document.

Our techniques improve ID document security. With reference to FIG. 11, a control fingerprint is harvested. For example, a human subject presents her fingerprint for fingerprinting in step 90. A fingerprint reader (e.g., like the DFR® 2090 discussed above) can be used to capture an image of the subject's fingerprint, or a previously captured fingerprint, which belongs the human subject, can be analyzed. NIST's NFIS software, which includes a minutiae detector called, MINDTCT, provides acceptable minutiae information in step 92. Of course, other software and/or techniques for determining minutiae information can be suitably interchanged with the MINDTCT module. While the minutiae information is represented graphically in FIG. 11, it need not be so.

The minutiae information is mapped or transformed into a minutiae domain (e.g., an intermediate domain which represents minutiae placement or locations). To illustrate, the minutiae information as identified in step 92 may be organized relative to a 512×512 pixel image. A mapping maps the minutiae points to, e.g., a 128×128 pixel area or to a location representation. Of course, the minutiae points can be mapped to larger or smaller areas as well. A minutiae map or grid shown in step 94 corresponds to such a mapping. In one implementation, to represent a direction angle of each minutiae point or a subset of minutiae points, a minutiae point's direction angle is encoded or assigned a pseudo-random phase. For example, a minutiae point is represented as a peak signal, with each peak including a pseudo-random phase relative to other peaks. In other implementations minutiae point orientation is disregarded.

A representation corresponding to a minutiae map is to be explicitly embedded via a digital watermark. Remember, above, that some watermark orientation signals include transform domain characteristics. So in one implementation, a minutiae map or minutiae domain is viewed as if it were a representation of (or a corresponding partner to) a transform domain characteristic, e.g., the minutiae domain is viewed as a transform domain specification. The minutiae map or minutiae domain is thus transformed, e.g., by an inverse fast Fourier transform (IFFT) in step 96. (Transforming the minutiae map allows for a single minutiae point to be transformed or spread to a large number, or possibly all, of the points in the transformed minutiae domain. Otherwise, embedding of the actual points as spatial points may result in unwanted visual artifacts and less robust embedding.). The transformed minutiae map is preferably permuted or scrambled (step 98), yielding a final spatial domain representation of the minutiae map 94. For example, the transformed minutiae map is scrambled using a known cryptographic key or algorithm, to provide security and/or interference suppression between the transformed minutiae map and a watermark orientation component. The permuted, transformed minutiae map is combined (step 102) with a watermark orientation component (item 100).

A photographic image corresponding to the human subject is provided (e.g., the unmarked image 104). A digital camera can directly capture the photographic image 104, or, alternatively, the photographic image 104 can be provided from a photographic data repository or from an image scanner, which optically captures an image from a printed photograph. The combined orientation component/minutiae information (sometimes collectively referred to as "watermark minutiae information") is steganographically embedded or combined 106 in the unmarked photographic image 104 to yield a marked photographic image 108. In some implementations the watermark minutiae information is redundantly embedded across the photographic image 104. In other implementations a transformed permuted minutiae map is tiled or redundantly embedded, with each instance of a transformed permuted minutiae map being represented differently according to a key (e.g., as introduced via block 98). The embedded photograph 108 is then printed on an ID document 110, or in some cases is stored in electronic or optical/magnetic memory of an ID document. The resulting ID document 110 includes information (e.g., watermark minutiae information) for validation.

Instead of embedding the watermark minutiae information in a photographic image, the watermark minutiae information can be embedded in a graphic, background, seal, ghost image (e.g., a faint image), optical variable device, hologram, Kinogram®, IR or UV images, line art, biometric representation (e.g., an image of a fingerprint, iris, etc.), artwork, etc, which are generally referred to as "artwork." The embedded artwork is printed on an ID document or stored in electronic or optical/magnetic memory of an ID document. In other implementations, the final spatial domain minutiae information (e.g., after step 98 in FIG. 11) is stored in a 2D barcode or the like. However, it is most preferable to steganographically embed minutiae information, e.g., in a photograph, for added security.

An authentication procedure is discussed with reference to FIG. 12. An embedded ID document 110 is presented to an optical scanner 120. The embedded ID document 110 includes watermark minutiae information, as discussed above, steganographically embedded therein. (If the watermarked image/graphic is stored on optical/magnetic memory or electronic circuitry, then the ID is presented to a suitable and corresponding reader.). The optical scanner captures image data corresponding to the ID document 108, e.g., captures image data corresponding to the embedded photograph 108 or a portion of the photograph 108. The captured image data includes the embedded watermark minutiae information.

A watermark decoder analyzes the captured image data. If needed to resolve image distortion such as rotation and scale, the watermark detector uses the embedded watermark orientation component to adjust the image data to compensate for such distortion (step 122). The watermark detector then reverses or unfolds the watermark embedding process to recover the minutiae map in a minutiae domain. For example, if the watermark is redundantly embedded in the image data, the watermark detector may accumulate image tiles (or blocks) to help improve a signal-to-noise ratio of the minutiae information (e.g., improving the signal-to-noise relationship of the final spatial domain minutiae information over the image data as in step 124). The accumulated image data is inversely permuted or unscrambled (step 126), according to a key or method corresponding to the permutation used in step 98 (FIG. 11). The inversely permuted image data is then transformed (step 128), e.g., using a corresponding transformation like a Fast Fourier Transform (FFT). Peaks or prominent locations are detected in the transform domain (step 130), which once determined, yield a minutiae map or minutiae domain specification (hereafter interchangeably referred to as a "control minutiae map," e.g., map 132).

A bearer (e.g., the human subject) of the ID document 110 presents her fingerprint to be sampled (step 140). This fingerprint is called a "sample fingerprint." (The sampling preferably uses the same protocol as was used to capture the original fingerprint. Otherwise, the authentication system preferably includes some knowledge of how the original fingerprint capture and the sample fingerprint capture processes differ, and may use this knowledge to compensate for any substantial differences. Knowledge of the original process can be carried, e.g., by a digital watermark component.). The sample fingerprint is analyzed to determine minutiae points (step 142), e.g., using NIST's NFIS software, specifically the MINDTCT minutiae detector. The minutiae points are mapped or transformed into a minutiae domain using the mapping procedure in step 94 (or a known variation of the procedure) as discussed with respect to FIG. 11. A minutiae map or minutiae domain specification for the sample fingerprint results (hereafter interchangeably referred to as a "sample minutiae map," e.g., map 144).

To validate the ID document 110, or to validate whether the bearer of the ID document 110 is an authorized bearer of the ID document 110, a generalized matching module 146 (e.g., a pattern matching module, location matching, etc.) determines whether the control minutiae map 132 matches or corresponds within a predetermined tolerance to the sample minutiae map 144. If the control and sample minutiae maps 132 and 144 match or otherwise correspond, the bearer is considered an authorized bearer of the ID document 110. Otherwise, the bearer is not considered an authorized bearer of the ID document 110. A similar determination can be made as to whether the ID document 110 is considered valid or trustworthy. The matching module 146 may output such results, or may output data which is used to determine such results.

Minutiae Location Matching

FIGS. 13 and 14 illustrate matching methods, which can be interchanged with the matching module 146 shown in FIG. 12. These techniques are helpful, e.g., when a sample minutiae map includes image distortion, such as rotation that may be introduced during image capture. If a sample minutiae map includes distortion there may be times where a sample minutiae map is mis-registered in comparison to a control minutiae map. The following techniques are also helpful when a minutiae determining algorithm creates an error (e.g., indicating that a minutiae point exists when it should not exist or mis-identifies a minutiae point). The distortion or minutiae errors may cause erroneous result if matching criteria is too stringent. Thus a matching module may benefit from a more flexible or relaxed matching criteria.

One inventive method calculates segment lengths between minutiae points and matches segment lengths to determine whether a control and sample minutiae map correspond. An outline of steps follows.

1. Line segments are constructed (perhaps virtually) between all possible minutiae locations in a sample minutiae map (FIG. 13a). The lengths of the line segments (e.g., in terms of pixels) and their corresponding minutiae end points are remembered, e.g. cached, stored or buffered, etc., in a "sample length list."
2. From a control minutiae map (FIG. 13b), two of the strongest (or most prominent) peaks or minutiae locations are identified. This step may optionally determine a relative listing of locations, from strongest or most prominent locations to weakest or less prominent locations. The list can also be truncated to include only the top, e.g., 25-50 locations.
3. A segment length between the two strongest minutiae points is determined (see FIG. 13c), and any matching segment lengths from the sample length list are identified.
4. The matching segments are added to an "Orientation Table" (see FIG. 13d). The orientation table is used to manage matching segments. The table will eventually include different entries, which are used to identify different hypothesizes for a correct orientation for registering the sample with the control minutiae map. To illustrate, say the strongest point from the control minutiae map corresponds to minutiae location no. 6 and the second strongest corresponds to minutiae location no. 10. And say a line segment (dotted line) between minutiae locations 6 and 10 is found to correspond (e.g., within some predetermined tolerance, perhaps even a tolerance associated with a fingerprint capture process) to a line segment formed between minutiae locations nos. 38 and 2 from the sample list. Then there are two possible orientation entries between the matching segments, as shown in FIG. 13d. That is, control minutiae location no. 6 may correspond to sample minutiae location no. 38 or to sample minutiae location no. 2, and control minutiae location no. 10 may correspond with sample minutiae location no. 2 or sample minutiae location no. 38.
5. For each new peak locations (e.g., in order of strongest to weakest from a relative listing of minutiae locations), a segment length between a new location and each of the old peak locations is determined. For example, for the $3^{rd}$ strongest location, a segment length is determined between the $3^{rd}$ and $2^{nd}$ locations and the $3^{rd}$ and $1^{St}$ locations (see FIG. 13e). Each segment length is compared to the sample length list to find possible match segments.
    a. Each matching segment is added as a new orientation. For example, say the $3^{rd}$ strongest location corresponds with control minutiae location no. 11. A length of a line segment formed between control minutiae location no. 11 and control minutiae location no. 10 is found to correspond to a segment length formed between sample minutiae location nos. 38 and 29. Two new entries are added to the orientation table (e.g., entries 3 and 4 in FIG. 13f).
    b. And since the table already has a "10-38" possible pair (see entry 2 in FIG. 13d), it is preferable to determine whether a matching segment (e.g., 11-29) should be added to the second entry as well. To determine whether to add another entry, one can determine whether the lengths of segments between candidate points coincide. For example: i) if the length of a segment between control minutiae locations 10 and 11 corresponds with the length of a segment between sample minutiae locations 38 and 29; and ii) if a length of a segment between control minutiae locations 6 and 11 corresponds with the length of a segment between sample minutiae locations 2 and 29, then the new candidate pair 11-29 is added to the second entry (FIG. 13f). (In general, for any orientation in the table, we prefer that the segment length between any two points on the control list, e.g., location numbers 6 and 11, match or correspond with a distance between corresponding points on the sample list, e.g., location numbers 2 and 29.)
6. Step 5 repeats for each possible line segment formed from new minutiae locations selected in, e.g., descending order from the list of the most relevant minutiae locations, or until a particular table entry grows to a predetermined number of entries, e.g., signaling a proper orientation between control and sample minutiae locations, and perhaps a match.
7. A proper orientation is determined by matching or registering corresponding points from within the largest table entry (in the FIG. 13f example—entry 2), and if the points match (or if a predetermined number of the points match), the control minutiae map is considered to correspond with the sample minutiae map.

FIG. 14 illustrates an alternative matching module/method. Here again, the matching utilizes segment lengths. An outline of step follows.

1. For each of a control minutiae map (FIG. 14a) and a sample minutiae map (FIG. 14b), determine lengths for all possible line segments in the map. That is, determine segments between every possible minutiae location. Of course, a list of the most relevant minutiae locations can be determined, with segments lengths being determined between only the relevant minutiae locations.
2. For each line segment determine an angle from a horizontal that is associated with the line segment, and categorize or map (or plot) of all the line segments according to segment length and angle. This categorization or mapping can be referred to as an angle map (FIGS. 14c and 14d).
3. Correlate the sample angle map with the control angle map. For example, a shifting correlation along the angle axis should identify a corresponding angle (or a difference in angle $\Delta\theta$) in which the two control angle maps correspond (that is, if the sample fingerprint corresponds with the control fingerprint). This process identifies an angle (or difference in angles), which provides a high correlation between the two angle maps (see FIG. 14e).
4. The sample minutiae map is adjusted according to the angle $\Delta\theta$, and the control minutiae map and the sample minutes map are then compared (e.g. point matching or segment matching) for correspondence. Alternatively, a judgment can be based on the angle $\Delta\theta$ itself; that is, if a $\theta$ is identified with at least a predetermined correlation value, then the sample fingerprint and the control fingerprint can be classified as matching or otherwise corresponding. Similarly, if no angle with a correlation value is found after correlation to meet or exceed the predetermined correlation value, then the sample fingerprint and the control fingerprint can be considered to not match or otherwise not correspond.

Optionally, if the control and sample minutiae maps include minutiae orientation information in terms of phase, the correlation angle can be subtracted from the sample map, and steps 2-4 are repeated. As a further optional step, the segments as represented in an angle map are augmented, e.g. rectangles are centered on selected segments. An area defined by a rectangle then represents a particular segment at a given angle. The area defined by a rectangle can be adjusted to provide a more forgiving matching module. A correlation process then correlates areas between the two angle maps. Of course, the area of the rectangles can be adjusted for (or to reflect) predetermined tolerances, e.g., a segment with a short distance can have a relatively shorter horizontal side, while a segment with a longer distance can include a longer rectangle side. Lengthening or shortening a rectangle's vertical edges can similarly adjust for (or reflect an) angular tolerance. An area-based correlation may be even more forgiving of minutiae calculation errors and image distortion.

Alternatives

In an alternative implementation, an ID document photograph includes a so-called fragile watermark, which is designed to degrade when subjected to certain types of signal processing, like scanning and printing. The condition (or absence) of a fragile watermark reveals whether the photograph has been tampered with.

The ID document may alternatively include multiple watermarks, which can be cross-correlated to detect tampering. For example, the photograph includes a first watermark—perhaps a message component that is associated with watermark minutiae information—and another portion of the document includes a second watermark. The first and second watermarks can be cross-correlated to help further authenticate the ID document. (See, e.g., U.S. patent application Ser. No. 10/686,495, filed Oct. 14, 2004, for even further details regarding cross-correlation of multiple features or watermarks for validation. The above patent application is herein incorporated by reference.). In another implementation the ID document includes two watermarks, one in the image 108 and one in a background, seal, graphic, etc. Each of the watermarks may include the minutiae information. The minutiae information between both watermarks can be compared, if desired, to further enhance security of the ID document.

Still further, a watermark may include an auxiliary data (or an identifier)—perhaps associated with watermark minutiae information—that, once decoded, is used to interrogate a data repository to obtain authenticating information, like a photograph of an authorized bearer of the ID document. The auxiliary data may be used to identify which finger (or thumb) corresponds to the control fingerprint, allowing the bearer of the ID document to present the appropriate finger for fingerprinting. Further still, an ID document may include multiple control minutiae maps, each corresponding to different fingerprints belonging to a bearer of the ID document, or corresponding to different people who are authorized to bear the ID document or who can be validated by the ID document. For example, one ID document can represent a family or group. Each member of the family or group provides a fingerprint from which a control minutiae map is generated. Each control minutiae is permuted differently to avoid interfering with the other maps. Each permuted map is combined, perhaps with an orientation component, and is embedded on/in the same ID document.

Also, instead of explicitly embedding fingerprint minutiae locations, our techniques can be applied to different biometric samples as well. For example, a mapping of predominate iris characteristics, hand geometries, facial patterns, etc., can be explicitly embedded in a photograph or other artwork as well.

Concluding Remarks

Having described and illustrated the principles of the technology with reference to specific implementations, it will be recognized that the technology can be implemented in many other, different, forms. To provide a comprehensive disclosure without unduly lengthening the specification, applicants hereby incorporate by reference each of the US patent documents referenced above, along with Appendix A, which is a related work of the inventors. Of course, the methods and systems described in Appendix A can be readily combined with the methods and systems described above.

The methods, processes, and systems described above may be implemented in hardware, software or a combination of hardware and software. For example, a digital watermark encoding processes may be implemented in a programmable computer or a special purpose digital circuit. Similarly, data decoding may be implemented in software, firmware, hardware, or combinations of software, firmware and hardware. The other methods and processes described above may be implemented in programs executed from a system's memory (a computer readable medium, such as an electronic, optical or magnetic storage device or removable or mass memory), or from hardware/software combinations.

The particular combinations of elements and features in the above-detailed embodiments are exemplary only; the interchanging and substitution of these teachings with other teachings in this and the incorporated-by-reference patents/applications are also expressly contemplated.

APPENDIX A

Statistical Quality Assessment of Fingerprint

1. Introduction

The quality of a fingerprint is essential to the performance of AFIS (Automatic Fingerprint Identification System). Such a quality may be classified by clarity and regularity of ridge-valley structures.[1,2] One may calculate thickness of ridge and valley to measure the clarity and regularity. However, calculating a thickness is not feasible in a poor quality image, especially, severely damaged images that contain broken ridges (or valleys). In order to overcome such a difficulty, the proposed approach employs the statistical properties in a local block, which involve the mean and spread of the thickness of both ridge and valley. The mean value used for determining whether a fingerprint is wet or dry. For example, the black pixels are dominant if a fingerprint is wet, the average thickness of ridge is larger than one of valley, and vice versa on a dry fingerprint. In addition, a standard deviation is used for determining severity of damage. In this study, the quality is divided into three categories based on two statistical properties mentioned above: wet, good and dry. The number of low quality blocks is used to measure a global quality of fingerprint. In addition, a distribution of poor blocks is also measured using Euclidean distance between groups of poor blocks. With this scheme, locally condensed poor blocks decreases the overall quality of an image. Experimental results on the fingerprint image captured by optical devices as well as by a rolling method show the wet and dry parts of image were successfully captured. Enhancing an image by employing morphology techniques that modifying the detected poor quality blocks is illustrated in section 3.

2. Method

2.1 Block Orientation

A fingerprint image is first divided into small blocks and an orientation of each Block is calculated using a global directional map. That map is derived by averaging quantized angles at all pixels within a block, where the angle at each pixel is the angle of slit that has the maximum values after measuring total pixel values with eight directional slits separated by $\pi/8$. The detail angle in each block is then obtained by changing a block orientation to a small degree to both clockwise and counterclockwise. The best angle is obtained when such an angle achieves the maximum column sum. Both global and detail angel calculation methods are based on the methods employed in NIST fingerprint image software.[3] Examples of a global direction map and block rotations are illustrated in FIGS. 1(*b*) and (*c*).

2.2 Thickness Calculation

Subsequently, the ridge lines in a rotated block are scanned in the direction normal to the ridge flow to measure the thickness of black and white lines, where the first and the last values in a line scan are ignored due to the possible incomplete lines. Noise removal filters are employed before and after the thickness calculation. A 1-D median filter along a ridge orientation (vertically) reduces noise that was amplified by rotation and the 5% of both high and low measured data are discarded. FIG. 1. (d) shows measured thickness in terms of the number of pixels for the rotated B/W block in FIG. 1. (c), where ridge and valley are represented by '+' and 'o' respectively. The high values of 'o' mark indicates that ridge lines are broken.

2.3 Local Quality Assessment

The two statistical measurements, mean and standard deviation, are calculated from collected data in each block. Those statistics determine the quality of local block that is classified into three categories: wet, good and dry. If a finger is wet, where the black pixels are dominate, the average thickness of ridge ($\mu b$) is larger than that of valley ($\mu w$). The opposite result is acquired if a finger is dry. Very high value of either $\mu w$ or $\mu b$ is the indication of poor quality. Further analysis for severity is performed with a spread ($\sigma$) that represents the clarity of lines. A good fingerprint image tends to have a small deviation value for both ridge and valley. However, if a finger is dry, the deviation of valley thickness is larger than one of ridge thickness due to thin and broken black lines. ON the other hand, the spread of ridge is significantly large is the case of wet fingerprint. Typical Gaussian distributions of such categories are shown in FIG. 2.(*c*), FIG. 3.(*c*), and FIG. 4.(*c*), where measurement of ridge and valley are represented by dotted and solid lines respectively. The statistical properties in Table 1 are used for classifying a quality, where the B/W ration is the ration of number of black and white pixels.

TABLE 1

Statistical properties for quality decision

|  | Dry | Wet |
| --- | --- | --- |
| $\mu b - \mu w$ | <0 | >0 |
| $\sigma w$ | high | low |
| $\sigma b$ | low | high |
| B/W Ratio | <<1 | >>1 |

2.4 Global Quality Assessment

The number of low quality blocks can be used to assess the global quality of a fingerprint. In other words, the quality is measured by dividing total number of low quality blocks. And the severity of dryness and wetness are calculated by considering only dry and wet blocks, Dry Index (DI)=Nd/Nt and Wet Index (WI) Nv/Nt, where Nd, Nw, and Nt are number of dry blocks, number of wet blocks, and number of total blocks respectively.

In addition, the distribution of poor blocks is also taken into consideration for a global quality. With this scheme, if poor quality blocks are locally condensed, the quality of that image is considered lower than one that has dispersed poor blocks. This property is measured by Cluster Index (CI) using Euclidean distances between groups of poor blocks.

3. RESULTS AND CONCLUSIONS

The proposed approach was tested on the fingerprint image captured by optical devices as well as by a rolling method captured by DMV. The size of image and a local block were [512×512] and [24×24] respectively. Typical results shown in FIG. 5 clearly shows the wet and dry block s of image were successfully captured.

Detected local blocks that were classified as dry or wet, can be modified using a morphology technique.[4] This technique reduces or expands the thickness or valley. Example shown in FIG. 6 illustrated that the morphology that were applied only on the dry blocks reduced the number of dry blocks, while that of wet blocks (marked as 'x') were unchanged. The detailed views of previous and after operation are shown in FIGS. 6.(d) and (e).

FIG. 7.(a) shows Dry Index (DI) on 31 data samples captured using an optical fingerprint scanner, where x-axis and y-axis represent data index and DI respectively. Dryness of $7^{th}$ and $31^{st}$ sample were close by observing DI: 0.148 and 0.155. However, the distribution of dry blocks were significantly different as illustrated in FIG. 8 and FIG. 9. The dry blocks are locally condensed at the lower right in the former figure, while those are dispersed in the latter. Such a distinction was well represented with Cluster Index calculated with groups of dry blocks that are marked in FIG. 8.(c) and FIG. 9.(c), where the CIs on the same 31 samples are plotted in FIG. 7.(b) in log scale.

REFERENCES

1. E. Lim, X. Jian, and W. Yau, "Fingerprint quality and validity analysis," IEEE ICIP, 2002.
2. L. Hong, Y. Wan and A. Jain, "Fingerprint image enhancement: Algorithm and performance evaluation," IEEE Transactions on Pattern Analysis and Machine Intelligence, vol. 20, 777-789, 1998.
3. NFIS, NIST Fingerprint Image Software, 10, 2001.
4. R. G. Gonzalez and R. E. Woods, Digital Image Processing, Addison-Wesley Publishing Company, 1992.

What is claimed is:

1. A method to analyze a fingerprint image corresponding to a human fingerprint of a human subject, the fingerprint image including ridges and valleys, the method being performed by execution of computer readable program code by a processor of a computer system, the method comprising:
   receiving a first fingerprint image corresponding to the human fingerprint of the human subject;
   processing the first fingerprint image to segment the image into at least a plurality of subsets;
   for each of the subsets:
      determining a measure associated with fingerprint ridges and fingerprint valleys in the each of the subsets, and
      based on the measure, assigning the each of the subsets to at least one of a plurality of categories;
   assessing an overall acceptability of the first fingerprint image by analyzing at least one of the plurality of categories; and
   causing capture of a second fingerprint image from the human subject if the overall acceptability of the fingerprint image is at or below predetermined criteria to process the first captured image.

2. The method of claim 1 wherein said analyzing comprises determining whether a number of subsets assigned to a first of the plurality of categories exceeds a predetermined value.

3. The method of claim 2, wherein the first category comprises at least one of acceptable, wet or dry.

4. The method of claim 2, further comprising accepting the fingerprint image when the number of subsets assigned to the first of the plurality of categories exceeds the predetermined value.

5. The method of claim 1, wherein processing the fingerprint image further comprises:
   determining image distortion associated with the fingerprint image; and
   adjusting the fingerprint image to compensate for the image distortion.

6. The method of claim 1, further comprising modifying image data defined by a subset when the subset is assigned to a predetermined category.

7. The method of claim 6, wherein modifying comprises: adjusting ridge or valley dimensions.

8. A method of generating an identification document including a fingerprint image, the method being performed by execution of computer readable program code by a processor of a computer system, the method comprising:
   receiving a first or a second fingerprint image that has been analyzed according to claim 1; and
   causing one or more of: printing the first or the second fingerprint image on the identification document and storing the first or the second fingerprint image in memory provided by the identification document.

9. A method to analyze a fingerprint image, the fingerprint image including ridges and valleys, the method being performed by execution of computer readable program code by a processor of a computer system, the method comprising:
   receiving a first fingerprint image corresponding to the human fingerprint of the human subject;
   processing the first fingerprint image to segment the image into at least a plurality of subsets;
   for each of the subsets:
      determining a measure associated with fingerprint ridges and fingerprint valleys in the each of the subsets, and
      based on the measure assigning the each of the subsets to at least one of a plurality of categories;
   identifying from the plurality of subsets one or more subsets corresponding to a fingerprint core, and weighing the identified one or more subsets corresponding to the fingerprint core more significantly relative to subsets that do not correspond to the fingerprint core;
   assessing an overall acceptability of the first fingerprint image by analyzing at least one of the plurality of categories;
   causing capture of a second fingerprint image from the human subject if the overall acceptability of the first fingerprint image is at or below predetermined criteria to process the first captured image.

10. A method to analyze a fingerprint image, the fingerprint image including ridges and valleys, the method being performed by execution of computer readable program code by a processor of a computer system, the method comprising:
   receiving a first fingerprint image corresponding to the human fingerprint of the human subject;
   segmenting the first fingerprint image into at least a plurality of subsets; and
   for each of the subsets:
      determining a statistical measure associated with fingerprint ridges and fingerprint valleys in the each of the subsets, wherein the statistical measure comprises at least a standard deviation of ridge thickness and a standard deviation of valley thickness, and
      based on the statistical measure, assigning the each of the subsets to at least one of a plurality of categories; and
   causing capture of a second fingerprint image to process the second captured image based on a quality associated with the fingerprint image computed based on the assigning of the each of the subsets to the at least one of the plurality of categories.

11. The method of claim 10, wherein the statistical measure further comprises at least one of mean of ridge thickness or mean of valley thickness.

12. A method of determining whether to accept a first fingerprint image or to cause capture of a second fingerprint image, the first fingerprint and second fingerprint images comprising a representation of a same human fingerprint, the fingerprint including ridges and valleys, the method being performed by execution of computer readable program code by a processor of a computer system, the method comprising:
- determining statistical values that are associated with at least some of the ridges and valleys;
- comparing the determined statistical values to predetermined acceptance criteria;
- performing a determination if a computed quality associated with the first fingerprint image is acceptable based on at least the comparing; and
- based on at least the determination, causing the capture of the second fingerprint image to process the second captured fingerprint image.

13. The method of claim 12, wherein the statistical values are determined based on ridge and valley thickness.

14. The method of claim 12, wherein statistical values associated with a fingerprint core are weighed more heavily than statistical values that are not associated with the fingerprint core.

15. The method of claim 12, wherein the statistical values comprise a measure related to a frequency domain analysis of at least some of the ridges and valleys.

16. A method of generating an identification document including a fingerprint image, the method being performed by execution of computer readable program code by a processor of a computer system, the method comprising:
- receiving a fingerprint image that has been processed according to claim 12; and
- performing one or more of: printing the fingerprint image on the identification document and storing the fingerprint image in memory provided by the identification document.

* * * * *